(12) United States Patent
Kinoshita

(10) Patent No.: US 6,617,739 B1
(45) Date of Patent: Sep. 9, 2003

(54) ROTARY ELECTRIC MACHINE

(76) Inventor: Yukio Kinoshita, 7-8, Mikanohara-cho 2-chome, Hitachi-shi, Ibaraki 316-0026 (JP)

( * ) Notice: Subject to any disclaimer, the term of this patent is extended or adjusted under 35 U.S.C. 154(b) by 0 days.

(21) Appl. No.: 09/564,807

(22) Filed: May 5, 2000

(30) Foreign Application Priority Data

May 6, 1999 (JP) .......................................... 11-161422
Jun. 8, 1999 (JP) .......................................... 11-196403

(51) Int. Cl.[7] .............................. H02K 1/00; H02K 1/12
(52) U.S. Cl. .................... 310/198; 310/216; 310/257
(58) Field of Search ................................. 310/254, 257, 310/216, 217, 218, 49 R, 49 A, 263, 51, 189, 191, 200, 209, 184, 148

(56) References Cited

U.S. PATENT DOCUMENTS

| | | | | |
|---|---|---|---|---|
| 2,397,183 A | * | 3/1946 | Kilgore et al. | 416/40 |
| 2,575,716 A | * | 11/1951 | Kilgore | 318/771 |
| 3,549,918 A | * | 12/1970 | Hout | 310/49 R |
| 3,693,034 A | * | 9/1972 | Inariba | 310/49 R |
| 3,952,219 A | * | 4/1976 | Mitsui et al. | 310/156 |
| 4,009,406 A | * | 2/1977 | Inariba | 310/164 |
| 4,528,485 A | * | 7/1985 | Boyd, Jr. | 318/138 |
| 4,691,155 A | * | 9/1987 | Taylor et al. | 318/771 |
| 5,331,237 A | * | 7/1994 | Ichimura | 310/44 |
| 5,952,760 A | * | 9/1999 | Miyazawa et al. | 310/194 |
| 5,986,379 A | * | 11/1999 | Hollenbeck et al. | 310/257 |

* cited by examiner

*Primary Examiner*—Dang Dinh Le
(74) *Attorney, Agent, or Firm*—Antonelli, Terry, Stout & Kraus, LLP

(57) ABSTRACT

A magnetic pole for facing an air gap with a stator is formed with a parallel quadrilateral shape or a quadrilateral shape having a skew effect and is obtained by a single iron core or plural iron cores. To make simply a winding structure of a stator and a rotor of an alternating current rotary electric machine, by a bobbin structure a magnetic field formation of a magnetic pole portion is formed. A magnetic pole structure having a projection portion is provided to form an overlap structure with another phase magnetic pole. An electromagnetic combination of each phase is strengthened and each phase magnetic poles is carried out a systematic separation, dispersion, and an arrangement.

7 Claims, 21 Drawing Sheets

*FIG. 2A1* 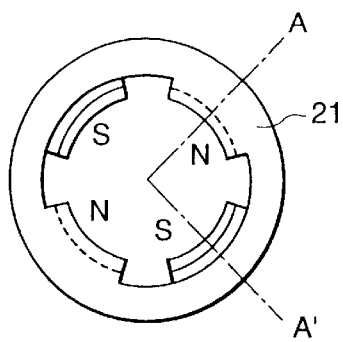 *FIG. 2A2* 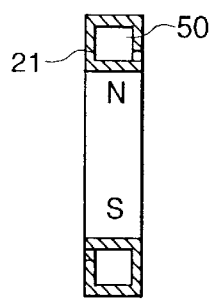
*FIG. 2B1* 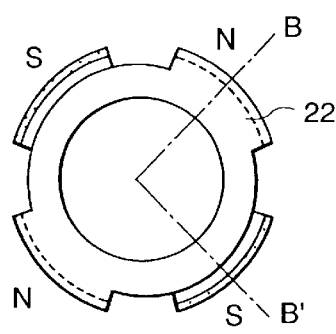 *FIG. 2B2* 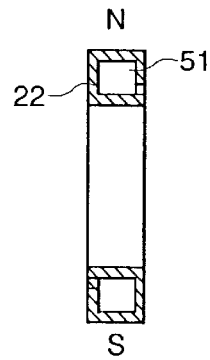
*FIG. 2C1* 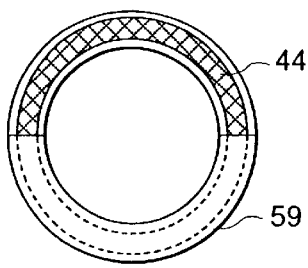 *FIG. 2C2* 

FIG. 3A1 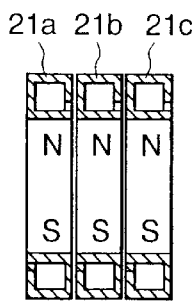 FIG. 3A2 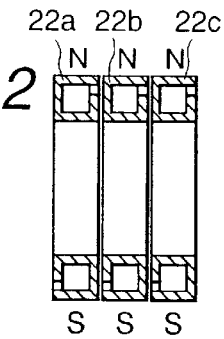

FIG. 6A1   FIG. 6A2
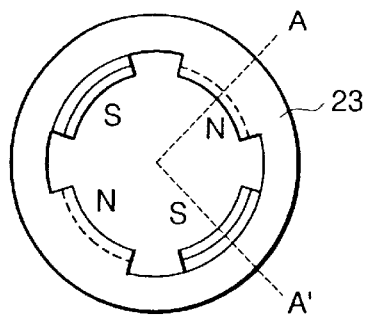 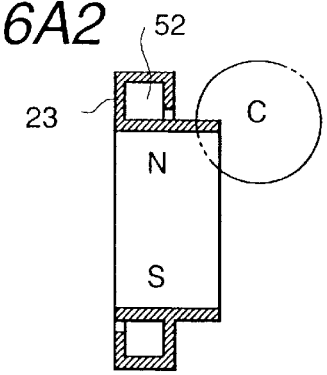
FIG. 6B1   FIG. 6B2
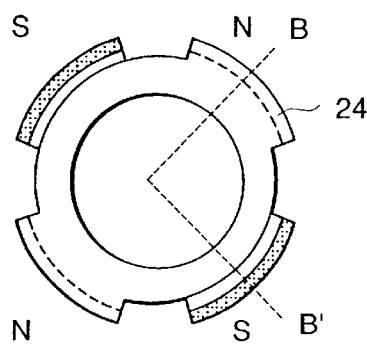 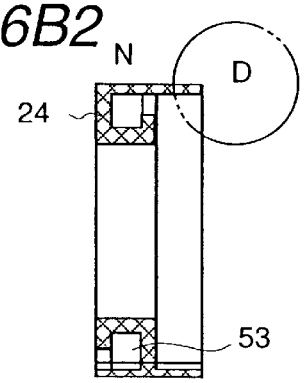
FIG. 6C1   FIG. 6C2
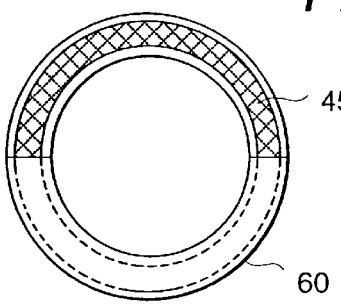 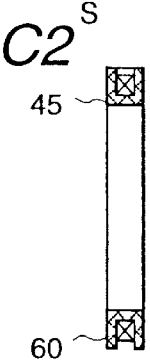
FIG. 6D
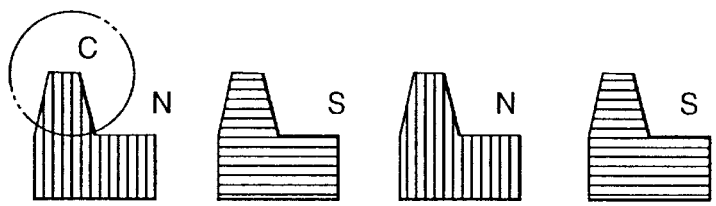
FIG. 6E
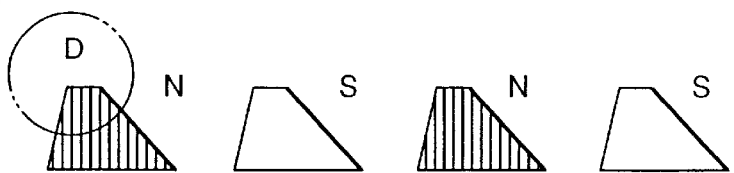

ROTARY ELECTRIC MACHINE

BACKGROUND OF THE INVENTION

The present invention relates to a rotary electric machine having a bobbin type electromagnet and an electromagnetic apparatus and, in particularly to, in an electric motor and a generator and an electromagnetic apparatus using singly a magnet and an electromagnet and using the magnet and the electromagnet together with and in the electric motor and the generator and the electromagnetic apparatus a magnetic pole structure and the winding structure and a combination of a magnetic pole and a winding structure wherein an output improvement and an efficiency improvement and a productivity of a magnetic pole iron core and an electric assembly working etc. can be improved remarkably.

The present invention relates to a rotary electric machine using a magnet and an electromagnetic machine and apparatus and in particularly to an electric motor having a rotor in which a magnet is used singly and a magnet is used together with an electromagnet and a generator and an electromagnetic machine and apparatus where to reduce a starting torque and a cogging a skew structure is provided to a slot formed between a stator and an iron core being arranged oppositely and relates to a magnetic pole structure durable fully for a centrifugal force during a high speed rotation.

In a stator of a generator and an electric motor and a winding type rotor according to the prior art, a winding is assembled and manufactured to a slot which is provided on a laminated electromagnetic steel plate and is provided to use a winding insertion. A winding end portion connection after the winding assembly and a formation and a fixing of an end coil are very complicated workings and these workings are high in cost and a working process is long. Further, it invites a lowering of a reliability of an insulation destroy etc. in use due to an injury at the working process, and a twining and an interference between a narrow slot and the winding, and a lowering of a slot occupation rate (normally 50%) for making good a workability of an assembling working.

Further, it invites a cost increase due to an extension of the end coil, and an efficiency lowering and an output lowering etc. due to a resistance loss increase of an end coil portion and an increase of a leakage magnetic flux. Further, it is difficult to carry out a machinery performance of the electric assembly working and in a case where the machinery performance is carried out it requires much cost for an equipment cost. Further, in a case of the electric machine having the low voltage and a middle and large capacity, the diameter of the winding becomes large and the working performance becomes bad further and the widely high cost occurs.

To reduce the starting torque of the electric motor and the generator, a laminated layer iron core of the stator and the rotor is shifted off with the straight shape or the zigzag shape to the circumferential direction and the skew formation is carried out. In this case, the cross-sectional area of the slot becomes small and the working performance etc. of the die-casting working of the winding and the rotor becomes bad further. Further, in a case of the high voltage electric machine etc., the insulation between the windings and the phases is difficult, when the insulation is carried out in the prior art iron core winding, to cope with this it is necessary to make large the laminated layer iron core and make large the slot area, accordingly the wide increase in the cost is invited.

Further, according to the prior art iron core winding structure, the electric machine used in the high temperature environment has a limitation 200 C by summing up the surrounding temperature and the temperature raise value of the coil and when it tends to raise the above stated limitation temperature it is necessary to use the ceramics material etc. having the heat resistance to the insulation structure, the structure body and the bearing member. Further, to realize this since the slot area is increased remarkably, it is impossible to carry out at the cost aspect and the technical aspect.

In a rotor of a generator and an electric motor according to the conventional technique, in generally a cylindrical shape magnet is used and to this during a magnetization time at a boundary between magnetic poles a space having a skew structure is provided. In this case, it requires an enormous cost to a magnetization equipment and it is not suited to a middle and a small mass production. Further, in the cylindrical shape magnet, since there is a limitation about a magnetic field formation, it is not suited to a high output and a high efficiency. Further, a division iron core is not used up to now and it is not taken a consideration about a centrifugal force accompanying with the division structure.

SUMMARY OF THE INVENTION

The objects of the present invention are to solve the above stated problems in a rotary electric machine, which are (1) a simplification of a winding structure according to an iron core structure, an iron core material and an iron core structure, (2) a simplification of a starting improvement, (3) a realization of a complex function electric machine, (4) a realization of a high heat resistance electric machine, etc., (5) a realization of a starting improvement and a cogging reduction by forming a skew structure formation, (6) a productivity improvement, and (7) a centrifugal force countermeasure during a high rotation necessary for a division iron core, etc.

As to (1) the simplification of the winding structure according to the iron core structure, the iron core material and the iron core structure, to make simple the winding structure of the stator and the rotor of the alternating current electric machine, for example, the winding is performed enable to form a magnetic field formation of a magnetic pole with a bobbin structure etc., and an iron core is formed structurally to have an eddy current in an alternating current magnetic field and to is taken into the consideration about a working performance, and further a material of the iron core is prepared by forming and constituting with a sintering material of an iron and a laminated layer iron core of an electromagnetic steel plate.

Accordingly, a winding performance becomes simply and the stator and the rotor having a high reliability, a low cost and a high mass-production performance can be provided. Further, to realize the stator and the rotor for a multi-phase alternating current electric machine, a magnetic pole structure having a projection portion is employed to form a space structure and an overlap structure between the magnetic pole portion and the another phase magnetic pole.

Accordingly, an electromagnetic combination between each phases is strengthened and at the same time by carrying out the systematic separation, the systematic dispersion, and the systematic arrangement of the each phases magnetic pole, for example, the effective formation of the rotation magnetic field can be formed. Further, to strengthen further the electromagnetic combination between each phases, between other phases mutually by carrying out the winding of the other phase, accordingly the magnetic filed formation of the rotation magnetic field can be carried out smoothly and then the electric machine having the high efficiency and the small vibration noise can be realized.

As to (2) the simplification of the starting improvement, using the bobbin structure electromagnet stated in the above item (1), each magnetic pole and each phase magnetic pole is shifted off with the linear shape or the zigzag shape to the circumferential direction, accordingly to the stator, the rotor, and the both of the stator and the rotor it is possible to provide the skew structure.

As to (3) the realization of the complex function electric machine, using the bobbin structure electromagnet stated on the above item (1), by forming plural the stator and the rotor of the electric motor and the generator toward the axial direction, it is possible to constitute the complex function electric machine in a single electric machine. By using singly, by forming complexly, and by combining the constitution electric machine, the electric power generation electric motor can be provided, and the change-over of the economic operation according to the change in capacity and the load can be carried out smoothly.

For example, to the wind force electric power generation in which the power force fluctuation is carried out many times plural generators are installed and in response to the strength of the wind force, by selecting a number of the operation generators the stability of the generation voltage can be carried out and further in a case of the lock condition during the strong wind force time all generators are made short the economic operation can be carried out.

As to (4) the realization of the high heat resistance electric machine, using the bobbin structure electromagnet, this electromagnet is applied to the stator and the rotor of the electric motor and the generator as the insulation material the material having the high heat resistance performance such as the ceramics is used and the heat resistance material is used to the casing, the combustible lubricating agent such as the oil and the grease in a magnetic bearing and an air bearing as a bearing is not used and the essential components are constituted, the high heat resistance electric machine can be realized.

A winding frame of the winding is formed with the bobbin structure having the simple structure and the ceramics material is used and to a take-out port of an inner and an outer portions as the insulation an insulator made of the ceramics is used, and the electric machine enable for the high temperature environment can be realized.

Incidentally, in the electric machine used in the present time, the highest temperature is about 200 C. but by selecting suitably the electric machine having the material of 400–500 C and in this case the iron and the iron casting can be employed not using the electromagnetic steel plate etc. in which the eddy current such as the iron core is taken into the consideration. As to the insulation of the winding, the superior high heat resistance material such as a glass coating and a glass fiber tube etc. can be used, and further in a case of the high temperature above 500 C., it requires that it is necessary to use an aluminum fiber tube etc. In a copper wire, when it becomes the high temperature it is necessary to change a conductor of a carbon fiber.

As to (5) the realization about the starting improvement and the cogging reduction, to a commonly used skew shape groove of a laminated layer iron core the radiation arrangement and rectangular shape magnet can not insert without a space because that in a laminated layer of the same shape iron plate since it forms a twist shape groove. Further, the manufacturing of the magnet which is well-suited to the twist shape groove becomes very high cost and it is not economically. Herein, it is devised to the iron core shape and it can be inserted with even the rectangular shape magnet without the space, to aim a holding of the iron core and an isolation from a shaft the skew shape groove is formed along to sides of a multi-angular shape non-magnetic body.

In this case, when a skew width W is varied, (a) in a case of the same multi-angular shape non-magnetic body, when a length of one side of the non-magnetic body is expressed by L, it changes within a range of $0 \leq W \leq 1/2 \times L$, (b) by varying the length L of the side of the multi-angular shape non-magnetic body, it is varied according to $W=1/2 \times L$, (c) in the cases (a) and (b), when the skew width W is insufficient, the iron core is divided in an axial direction, with the limitation ($1/2 \times L$) of the skew width W according to the side length L of the multi-angular shape non-magnetic body the division iron of the division iron core it is possible to form the skew width $W=1/2 \times k \times L$ of a multiple of a maximum division number k.

Further, to a straight iron core (no skew) divided into n-division in the axial direction, after n-divided magnet is inserted to the shaft, according to a skew angle n pieces iron core are rotation arranged adjacent iron core each other and a zigzag shape groove is formed at first and to an outside portion (in a case of an outer rotary type rotor, in an inner portion), a cylindrical iron core which has performed the straight skew shape groove is arranged and the skew effect is formed and realized.

When the cylindrical shape iron core is used, and when according to the zigzag shape groove to improve the magnetic characteristic and to minutely adjust the skew width and it is necessary to make thick a thickness of the iron core, in the manufacturing aspect it is carried out using plural iron cores. In this case, to raise the productivity in place of the magnet iron core or an outer periphery arrangement and cylindrical shape iron core, the laminated layer iron core can be used.

Further, when the rotor iron core is formed with an integral laminated iron core, in a case of insertion of the magnet, to not occur a space between the magnet and the iron core the magnet is divided into a number for enable insert to the skew shape groove, the productivity can be improved remarkably. Further, according to the combination of the magnets having different strength in the characteristics of the electric machine, an alternation and an improvement of the characteristic can be carried out easily.

As to (6) the improvement of the productivity, an iron core formation according to the iron block is not suited to the middle and small mass production. In ideal, it is desirable to manufacture integrally a stator core and a rotor core. Herein, to intend to use some laminated layer iron cores with parts or in wholly, it is devised the structure and realized by providing the skew structure formation use equal pitch pole to the magnetic iron core.

As to (7) the centrifugal force countermeasure during the high rotation time necessary for the division iron core, the apparatus has a pin hole having the enough strength and a concentrically ring shape groove and a cut-off portion to the division iron core etc., and to a side plate or the iron core is divided into with n-picas in the axial direction and according to the penetration of an isolation plate provided between the iron cores or an integral pin or a ring etc. the division iron cores are engaged with a hole provided on the iron core and a ring shape groove and a cut-off portion. Accordingly, the structure enable for the enough durable strength can be realized. Further, according to the demands, the side plate and the isolation plate is formed with the non-magnetic material to prevent a leakage of the magnetic field.

BRIEF DESCRIPTION OF DRAWING

FIG. 2A1 is a structural explanatory view showing an iron core having no projection portion which is used in a stator and a winding type rotor of four poles electric machine;

FIG. 2A2 is a cross-sectional view showing the iron core taken along to a line A—A shown in FIG. 2A1;

FIG. 2B1 is a structural explanatory view showing an iron core having no projection portion which is used in a stator and a winding type rotor of four poles electric machine;

FIG. 2B2 is a cross-sectional view showing the iron core taken along to a line B—B shown in FIG. 2B1;

FIG. 2C1 is a partial cross-sectional view and a structural explanation view of an iron core;

FIG. 2C2 is a cross-sectional view showing the iron core shown in FIG. 2C1;

FIG. 3A1 is an explanatory view showing an example in which three iron cores are adopted to a stator of four poles electric machine;

FIG. 3A2 is an explanatory view showing an example in which three iron cores are adopted to a rotor of four poles electric machine;

FIG. 6A1 is a structural explanatory view showing an iron core having no projection portion which is used in a stator and a winding type rotor of four poles electric machine;

FIG. 6A2 is a cross-sectional view showing the iron core taken along to a line A—A shown in FIG. 6A1;

FIG. 6B1 is a structural explanatory view showing an iron core having no projection portion which is used in a stator and a winding type rotor of four poles electric machine;

FIG. 6B2 is a cross-sectional view showing the iron core taken along to a line B—B shown in FIG. 6B1;

FIG. 6C1 is a partial cross-sectional view and a structural explanation view of an iron core;

FIG. 6C2 is a cross-sectional view showing the iron core shown in FIG. 6C1;

FIG. 6D is a magnetic pole face of four poles which is developed along to a circumference of a magnetic pole portion of an iron core having no skew effect for a starting compensation;

FIG. 6E is a magnetic pole face of four poles which is developed along to a circumference of a magnetic pole portion of an iron core having the skew effect for a starting compensation;

DESCRIPTION OF THE INVENTION

Figure 1A:
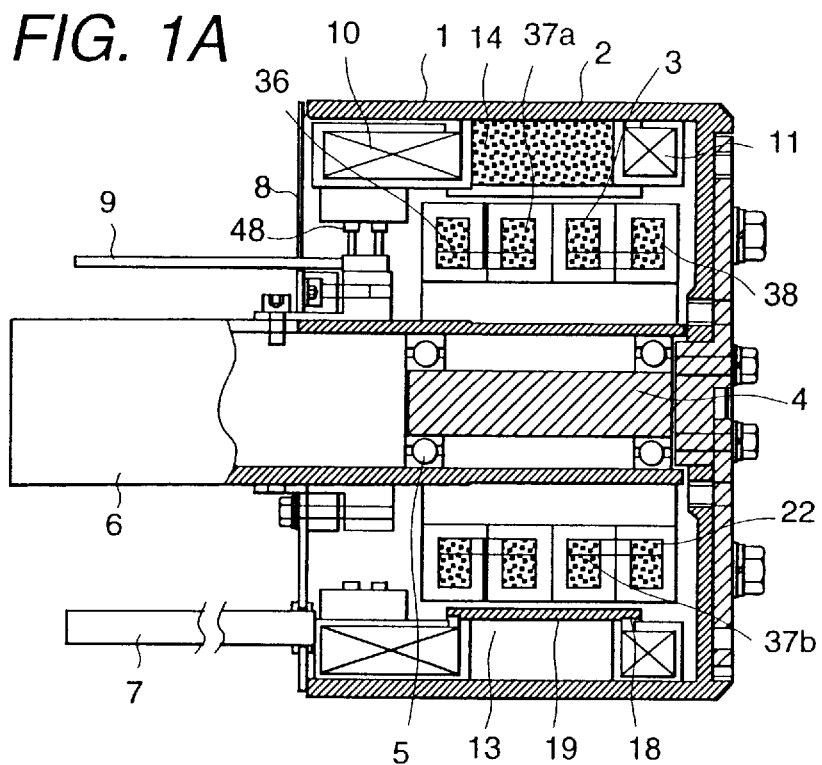
FIG. 1A is a structural explanatory view of an outer rotary type generator having a stator which is constituted by a bobbin type electromagnet according to the present invention.
Figure 1B:
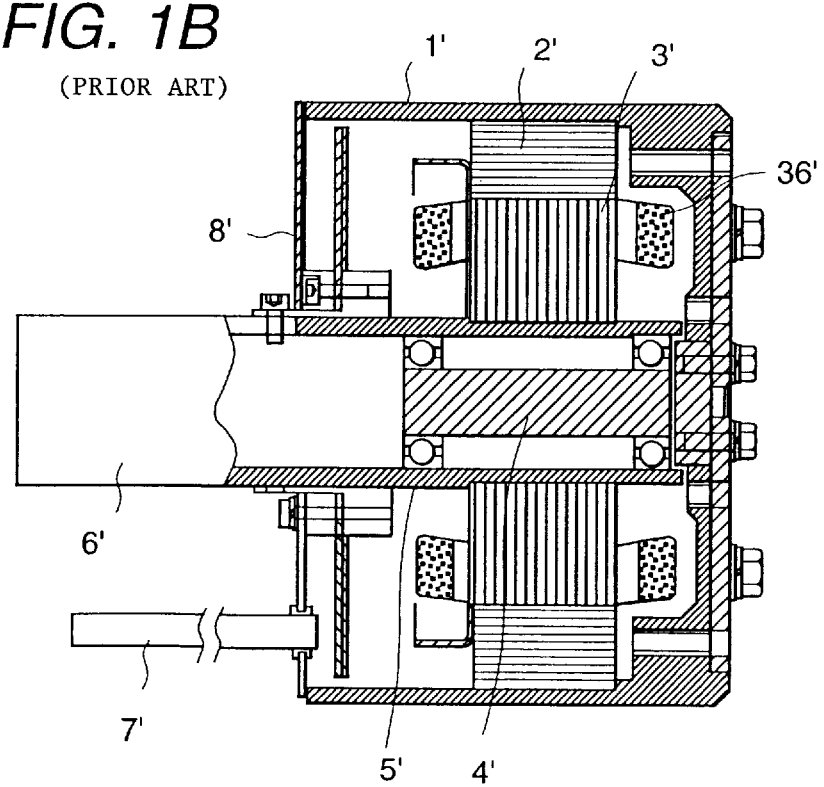
FIG. 1B is a structural explanatory view of an outer rotary type generator having a stator according to the prior art.

Herein-after, one embodiment for carrying out the present invention will be explained for exemplifying referring to an outer rotary type generator. FIG. 1A shows an outer rotary type generator according to the present invention. FIG. 1B shows an outer rotary type generator according to the prior art.

As shown in FIG. 1B, the conventional generator 1' comprises a cylindrical shape magnet rotor 2', a stator 3', a shaft 4' for driving the rotor 2', a shaft 4', bearing members 5' for supporting the shaft 4', a bearing holding pipe 6', and an electric power take-out cord 7', an end bracket 8', and a coil 36'. FIG. 1B shows a cross-section structure of a generator in which to a laminate type iron core according to the prior art winding assembly stator 3' is used.

On the other hand, as shown in FIG. 1A, in the embodiment according to the present invention, a generator 1 comprises a cylindrical shape magnet rotor 2, a stator 3, a shaft 4 for driving the rotor 2, a shaft 4, bearing members 5 for supporting the shaft 4, a bearing holding pipe 6, and an electric power take-out cord 7', an end bracket 8, an electromagnet power supply line 9, electromagnets 10 and 11, a division iron core 13, a magnet 14, a side plate 18, a rotor bar 19, an electromagnet iron core 22, coils 36, 37a, 37b and 38, and a slip ring 48.

FIG. 1A shows a cross-section structure of the outer rotary type generator and this generator 1 has the stator 3 which is constituted by a bobbin type electromagnet according to the present invention and the rotor 2 which is constituted by the electromagnets 10 and 11 and by a combination those.

In the present invention shown in FIG. 1A, when the rotor 2 is driven from an outside by a power source, to the coils 36, 37 and 38 etc. which are wound up to the stator 3 the voltage generates according to the rotation number and to an electric power take-out cord 7 when a resistance such as a load an electric current is flown and then an electric power is supplied. A generation voltage of the coil is proportional to a magnetic flux of an air gap between the stator 3 and the rotor 2 and also to a rotation number.

According to the present invention, the productivity performance of the stator 3, which is a long-pending question but is not found out yet up to now a solving countermeasurement, can be solved. Namely, according to the present invention, it exemplified an example in which the bobbin structure stator 3 being constituted by four iron cores 22, the coils 36, 37a, 37b, 38, and an electromagnetic-connection coil etc. is used. The material of the iron core 22 is constituted by a Ferro system sintering material in which an eddy current hardly flows against the current magnetic field, a combination of laminated components of plural electromagnetic-magnetic steel plates in which the productivity performance is taken into the consideration, or a combination of the above stated sintering material and the laminated components of the electromagnetic steel plate, etc.

In this iron core 21, to a bobbin which has a reel shape and has a high electrical insulation a coil having a high occupation rate is wound with a spool (bobbin) shape. Since a winding-up of an electric wiring to the reel is mounted on a plurality of reels to a shaft of an electric machine and is wound up at one time, a winding assembly working is completed, there is a remarkable difference in comparison with the prior art assembling working to the laminate iron core, the productivity cost is low and the reliability performance such as the insulation performance is remarkable high.

Next, as to the bobbin type electromagnet according to the present invention, herein-after the iron core structure, the winding portion structure and the stator of the electric machine and generator, the winding type rotor structure etc. will be explained referring to the drawing. FIG. 2A1 shows a plan view and FIG. 2A2 shows a side cross-sectional view of the iron core 21 used in an inner type rotary machine. FIG. 2B1 shows a plan view and FIG. 2B2 shows a side cross-sectional view of the iron core 22 used in an outer type rotary machine.

FIG. 2C1 shows a plan view and FIG. 2C2 shows a side cross-sectional view in which a part of the coil 44 for forming the electromagnet by mounting the slots 50 and 51 of the iron cores 21 and 22 and a reel 59 formed by a bobbin shape and an electric insulation body is cut off.

With the above stated construction, the winding assembly working can be improved remarkably in comparison with the prior art stator and the prior art winding type rotor and at the same time the improvement in the occupancy and the improvement of the reliability performance relating to the burning loss according the injury can be obtained remarkably.

Figure 2D:
FIG. 2D is a magnetic pole face of four poles which is developed along to a circumference of a magnetic pole portion of an iron core having no skew effect for a starting compensation.
Figure 2E:
FIG. 2E is a magnetic pole face of four poles which is developed along to a circumference of a magnetic pole portion of an iron core having the skew effect for a starting compensation.

Each of FIG. 2D and FIG. 2E shows a magnetic pole face of four poles which is developed along to a circumference of a magnetic pole portion of the iron cores 21 and 22 and show ones of a skew effect having a starting compensation use skew effect and a non-skew effect having a starting compensation use skew effect.

The slots 50 and 51 of the iron cores 21 and 22 shown in FIG. 2A1 and FIG. 2B1 is formed to mount a coil 44 wound to a reel 59, (to an insulated iron core using this slot it can be wound up directly), and to this coil 44 when the current is flown to the surface of the magnetic pole N pole and S pole shown in figure can be formed.

Figure 3B:
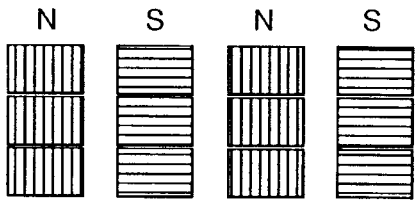
FIGS. 3B–3F are development views showing a magnet pole of a winding type rotor of four poles electric machine.

FIGS. 3A–3F show an example in which using three iron cores shown in FIGS. 2A1–2E various kinds of the stators and the winding type rotors are constituted. FIG. 3A1 and FIG. 3A2 show a combined cross-section and the stators of the inner rotary type rotary motor and the winding type rotors of the outer rotary type rotary motor and the stators of the inner rotary type rotary motor and the winding type rotors of the outer rotary type rotary motor which are formed using the iron cores 22a, 22b and 22c.

Figure 3C:
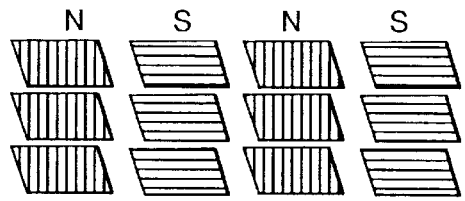
Figure 3D:
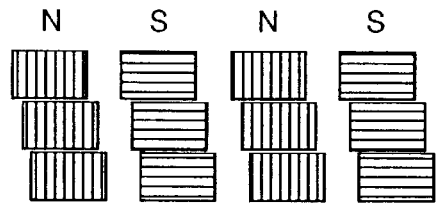

FIGS. 3B, 3C and 3D are development views of the magnetic pole portions of the winding type rotors of four poles rotary motors and FIG. 3b shows a simple rectangular shape magnetic pole type having no skew effect for a starting compensation.

Figure 3E:
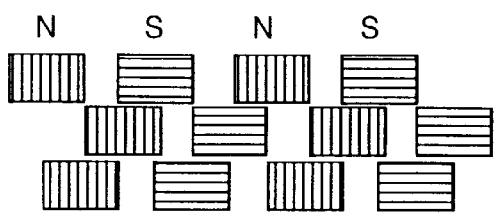
Figure 3F:
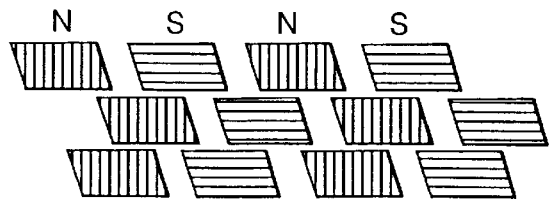

FIG. 3D shows an iron core in which a magnetic pole is a simple rectangular shape and the iron cores are constituted by shifting off adjacent iron cores having a proper angle having a skew effect to a circumferential direction. FIGS. 3E and 3F show an example in which the iron core is adopted to a three-phase four poles stator. FIG. 3E shows a simple rectangular shape magnetic pole shape having no starting compensation use and FIG. 3F shows a combination of the iron cores having a magnetic pole shape having a skew effect.

Figure 4A:
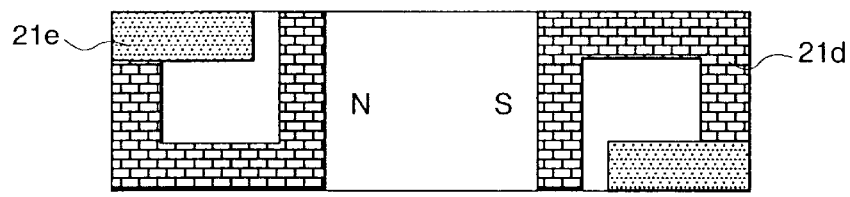
FIGS. 4A–4E are explanatory views showing a construction example of an iron core of an inner peripheral face magnetic pole type having a magnetic pole portion having no projection portion.

FIGS. 4A–4E and FIGS. 5A–5E show explanation views showing construction examples in which the iron core having no projection portion is constituted by various materials. FIGS. 4A–4E show a constitution example in which a magnetic pole is formed at an inner peripheral face and FIGS. 5A–5E show a constitution example in which a magnetic pole is formed at an outer peripheral face. FIG. 4A shows the iron core which is made of a ferrite system sintering material and a material in which ferrite powders etc. are hardened by a combination material such a resin etc. and the iron core is formed by an iron core 21d and an iron core 21e and after a coil insertion the iron core is assembled as one body.

Further, a division face of the iron core 21d and the iron core 21e can made other cross section, except for the example of the cross section shown in figure, taking into the consideration of the structure and the productivity. Further, the iron core 21d and the iron core 21e are made with an integral structure and of course it is possible to make the winding working as the series winding. Further, when it is used to the electromagnet, the material of the iron core can be made by a ferrite system steel material.

Figure 4B:
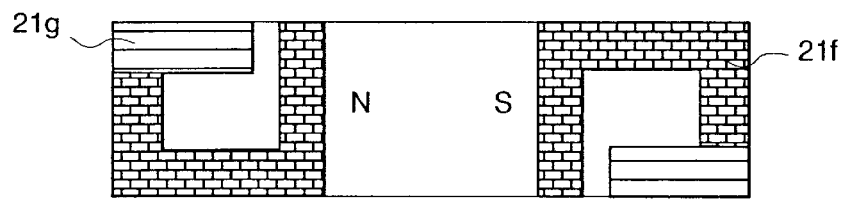
Figure 4C:
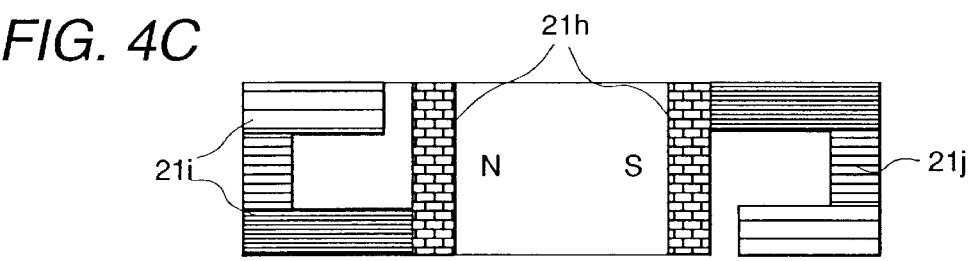

FIG. 4B shows in place of the iron core 21e a laminated iron core 21g such as the electromagnetic steel plates etc. is constituted. FIG. 4C shows an example in which it is constituted by an iron core 21h which is made of a material which is hardened using a ferrite system sintering material and a combination material in which ferrite powders are hardened by of a resin etc. and two laminated iron cores 21l such as an electromagnetic steel plate etc. and a laminated iron core 21j.

Figure 4D:
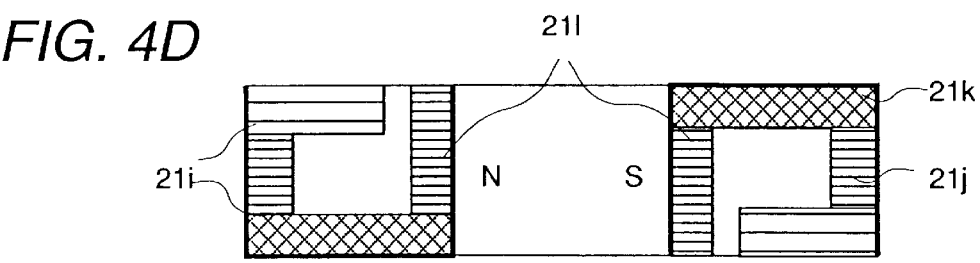
Figure 4E:
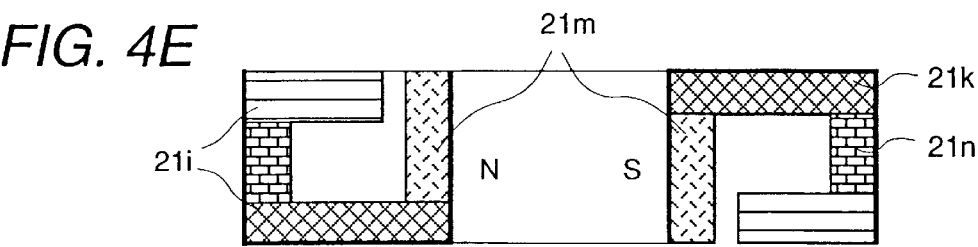
Figure 5A:
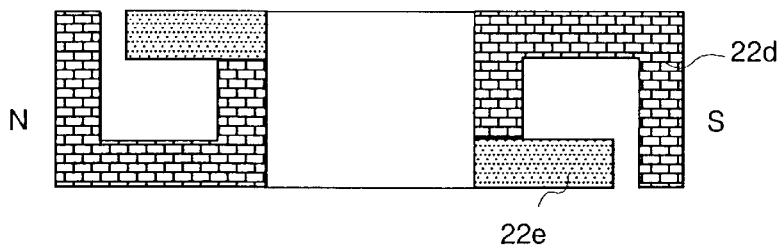
FIGS. 5A–5E are explanatory views showing a construction example of an iron core of an outer peripheral face magnetic pole type having a magnetic pole portion having no projection portion.
Figure 5B:
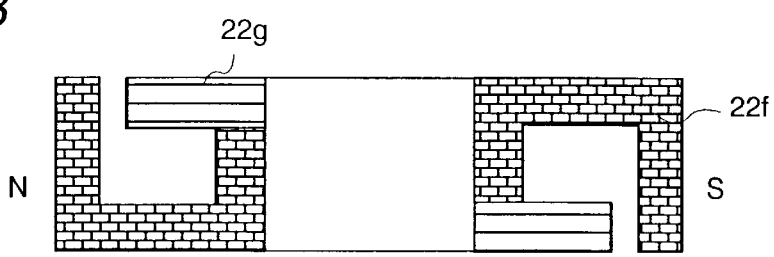
Figure 5C:
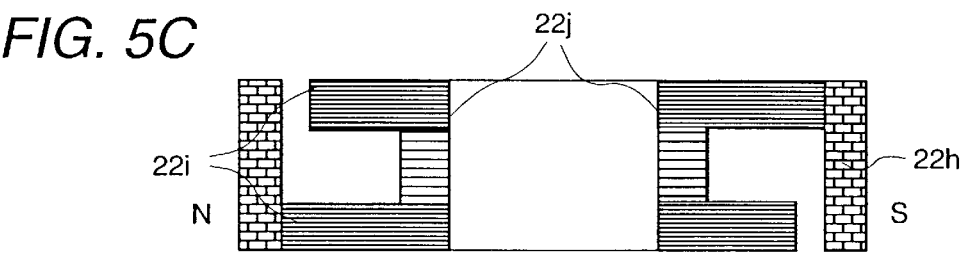
Figure 5D:
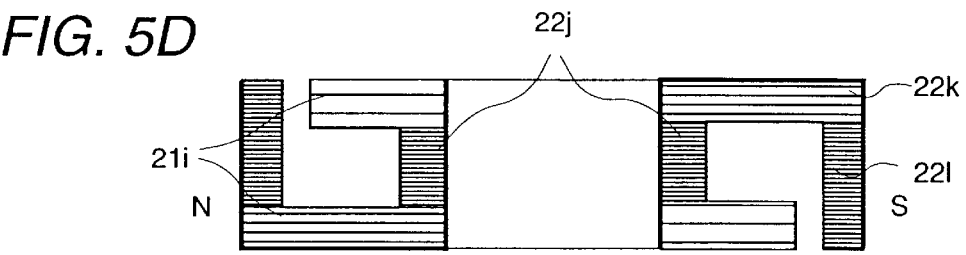
Figure 5E:
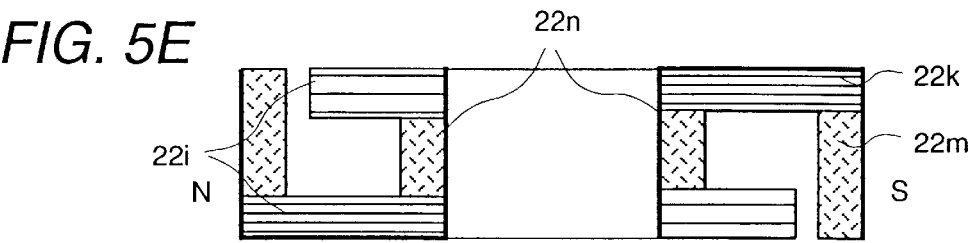
Figure 7A:
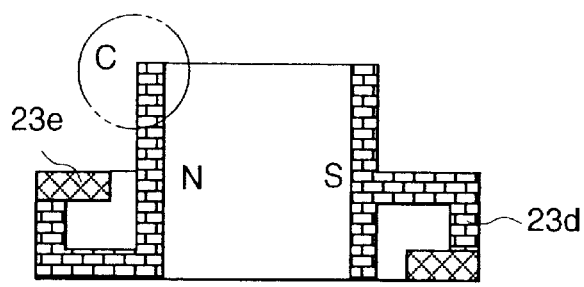
FIGS. 7A–7E are explanatory views showing a construction example of an iron core of an inner peripheral face magnetic pole type having a magnetic pole portion having a projection portion.
Figure 7B:
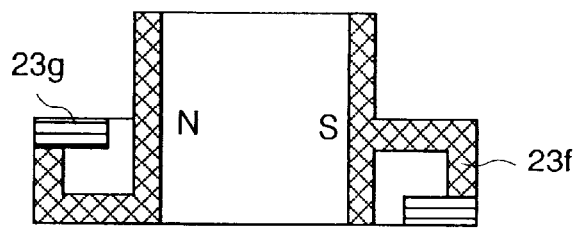
Figure 7C:
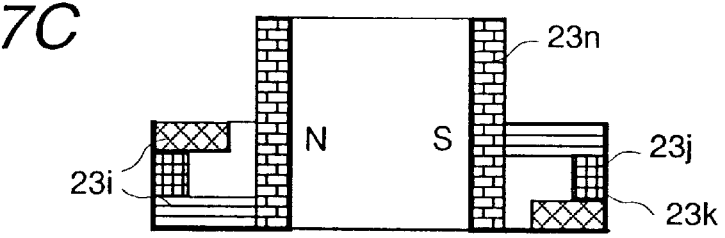
Figure 7D:
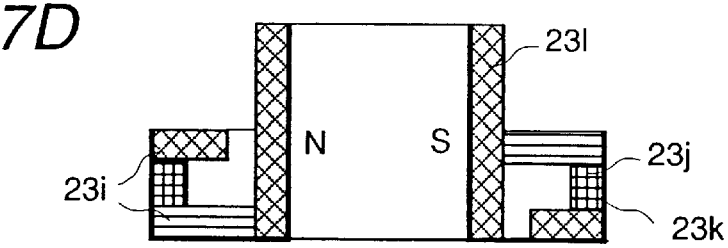
Figure 7E:
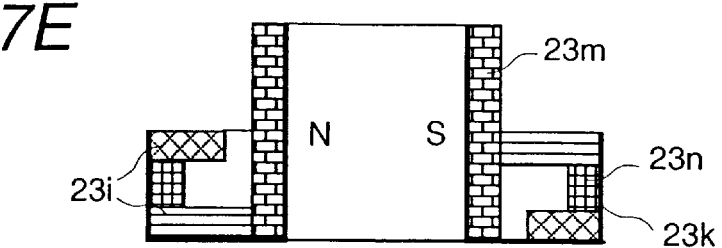
Figure 8A:
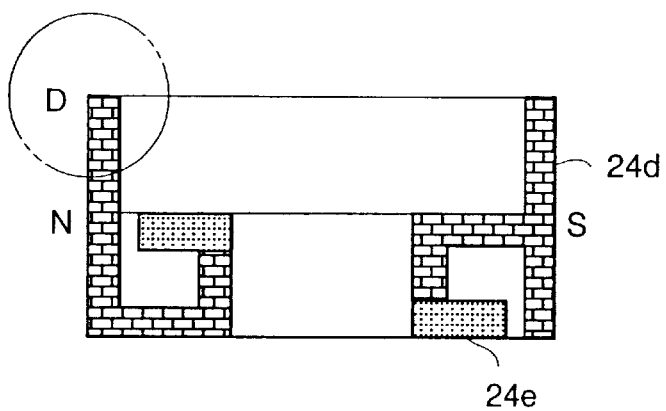
FIGS. 8A–8E are explanatory views showing a construction example of an iron core of an outer peripheral face magnetic pole type having a magnetic pole portion having a projection portion.
Figure 8B:
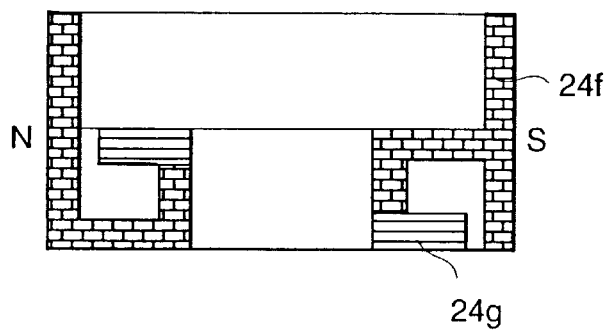
Figure 8C:
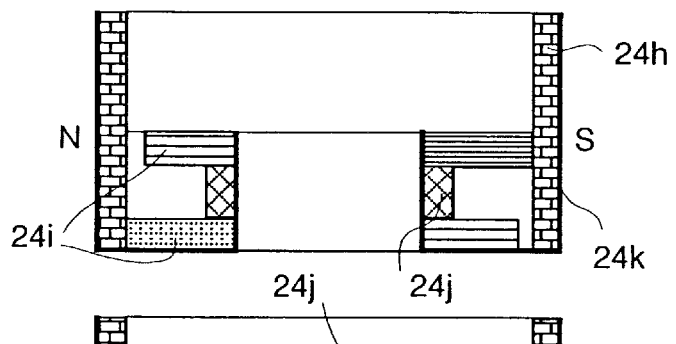
Figure 8D:
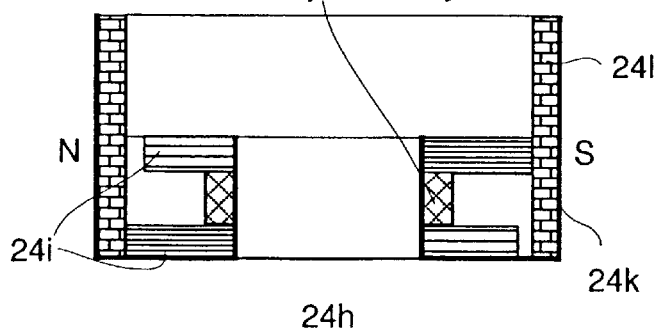
Figure 8E:
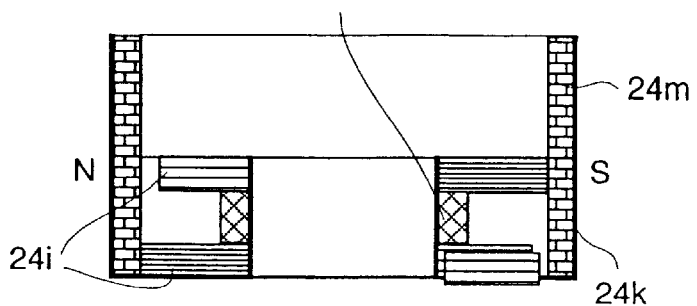

In this case, when the assembly working is difficult by the combination of the four iron cores, a magnetic pole frame 21k which is made of a ferrite thin plate used in FIGS. 4D and 4E may be installed, and then a durable magnetic pole iron core can be employed. FIG. 4D shows an example in which all magnetic iron core components are laminated by the electromagnetic steel plates etc. and it is completed by installing the magnetic pole frame 21k.

FIG. 4E shows an example in which an iron core 21m and an iron core 21n which is made of material in which a ferrite system sintering material and ferrite powders are hardened by a combined material are arranged an inner periphery and an outer periphery and two laminated iron cores 21l are installed to the magnetic pole frame 21k. Herein, several examples of the magnetic pole iron cores are shown, however according to a specification and a service the combinations of other iron cores can be employed.

In above, using FIGS. 4A–4E it is explained, as to FIGS. 5A–5E since FIGS. 5A–5E have a reversal structure of the inner and outer periphery in FIGS. 4A–4E, an explanation thereof will be omitted.

FIGS. 6A1–6E show a structure in which to the magnetic pole portion used in the stator and the winding type rotor of the four poles electric machine explained in FIGS. 2A1–2E and to the iron core structure having no projection portion, a projection portion C and a projection portion D are provided. FIG. 6A1 shows a plan view and FIG. 6A2 shows a side cross-sectional view of the iron core 23 used in the inner rotary type electric machine.

FIG. 6B1 shows a plan view and FIG. 6B2 shows a side cross-sectional view of the iron core 23 used in the inner rotary type electric machine. FIG. 6C1 shows a plan view and FIG. 6C2 shows a side cross-sectional view in which a part of a coil 45 for forming an electromagnet which is mounted on slots 52 and 53 of the iron cores 23 and 24 and a part of a bobbin 60 made by a reel shape electric insulation body are cut off.

FIG. 6D and FIG. 6E show an example of the four poles electromagnetic face shape which is developed along to the circumference of the electromagnetic portion of the iron cores 23 and 24 and FIG. 6D shows the structure having no skew effect and FIG. 6E shows the structure having the skew effect. The slots 23 and 24 of the iron cores 23 and 24 shown in FIGS. 6A1–6A2 and FIGS. 6B1–6B2 is formed to mount the coil 45 wound on the bobbin 60 (to the insulated iron core using this slot it is possible to form to wind up directly), to this coil 45 when the current is flown to the surfaces of the magnetic pole N pole and S pole shown in figure can be formed.

FIGS. 7A–7E and FIGS. 8A–8E show the magnetic pole portion explained in FIGS. 4A–4E and FIGS. 5A–5E in which only the projection portions C and D differ, then an explanation thereof will be omitted.

FIGS. 9A–9D and FIGS. 10A–10D show four examples in which according to the combination of the bobbin winding electromagnet according to the present invention, the stator and the winding type rotor of the four poles multiphases electric machine are formed. FIGS. 9A–9D show a development view of the magnetic pole face having no skew effect for the starting compensation and FIGS. 10A–10E show a development view of the magnetic pole face having the skew effect for the starting compensation.

Figure 9A:
FIGS. 9A–9D are shape explanatory views showing a magnetic pole face of a stator of four poles multi-phase electric machine and a winding type rotor having no skew effect for an starting compensation use.

Herein, the detail will be explained using FIGS. 9A–9E. FIG. 9A shows the example of the stator and the winding type rotor of the four poles two phases electric machine and in which it is constituted by two electromagnets having the projection magnetic pole and the projection magnetic pole portion is combined with to electromagnetic engagement to other phase coil. To carry out more effectively the electromagnetic engagement, the means such as the contact and the overlap to the other party iron core is performed.

With this means, the rotary magnetic field can be generated smoothly to the magnetic pole face of the stator, accordingly it can realize the electric machine having the performance improvement and the small vibration noise.

Figure 9B:
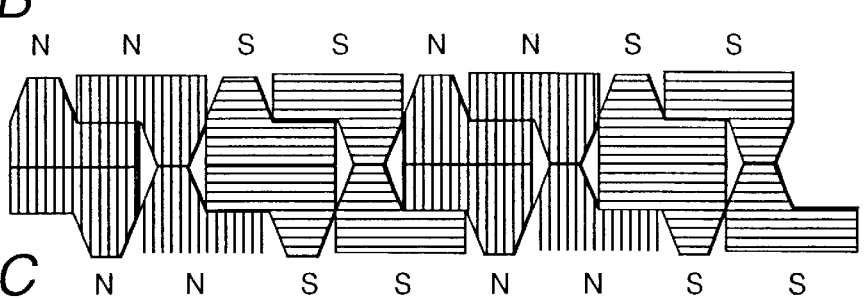

FIG. 9B shows an example in which it is used as the stator and the winding type rotor of the four poles three phase electric machine. In FIG. 9B, it is constituted in a central one phase two electromagnets are used and in both ends other two phases electromagnets. The electromagnetic engagement to other phase is carried out respectively according to the projection portion and when in the combination unbalance is occurred, by placing side by side the other phase coil and then the balance is taken. By the juxtaposition of the magnetic pole having the projection portion and the coil, the smooth rotary magnetic pole can be realized and the rotary machine having the further improvement of the performance and the small vibration noise.

Figure 9C:
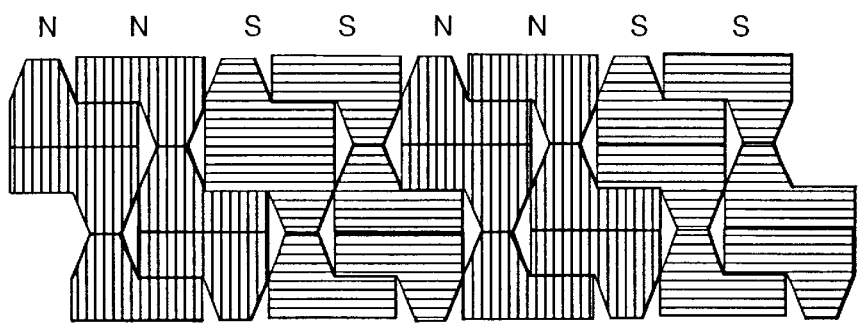

FIG. 9C shows an example in which the stator and the winding type rotor is used in the four poles three phase electric machine. In FIG. 9C, the electromagnet having each two phases is combined organically as shown in the figure and the electromagnet combination between each phases is arranged with good balance. In this case, without the juxtaposition of the other coil the rotary magnetic field can be formed.

Figure 9D:
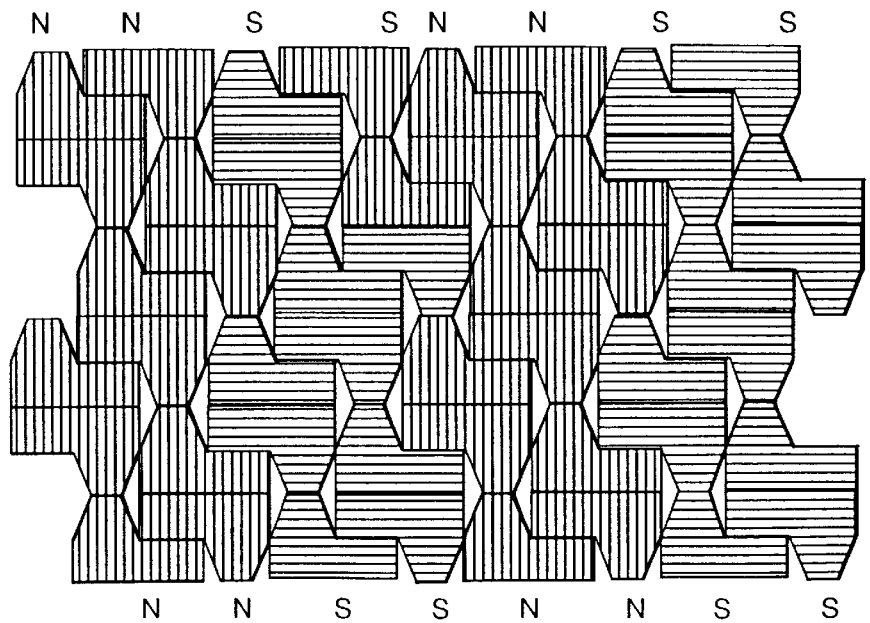
Figure 10A:
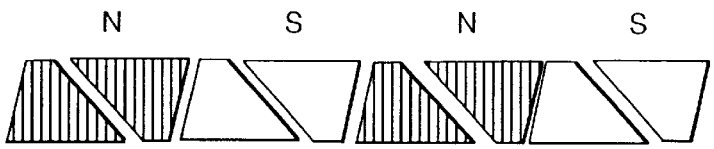
FIGS. 10A–10D are shape explanatory views showing a magnetic pole face of a stator of four poles multi-phase electric machine and a winding type rotor having the skew effect for an starting compensation use.
Figure 10B:
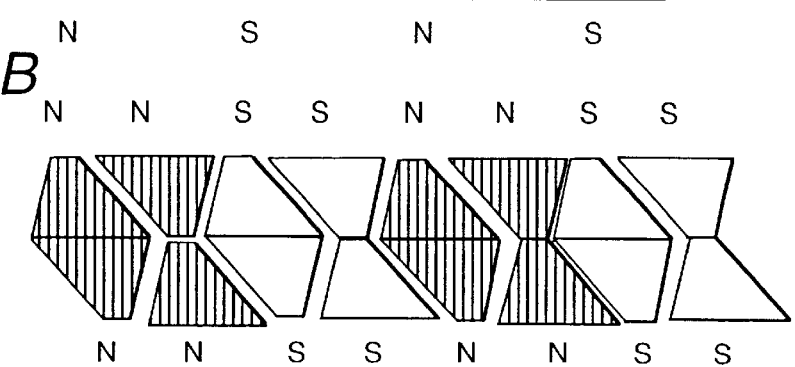
Figure 10C:
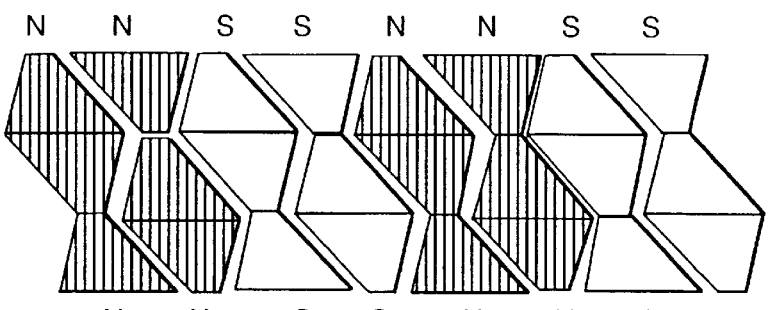
Figure 10D:
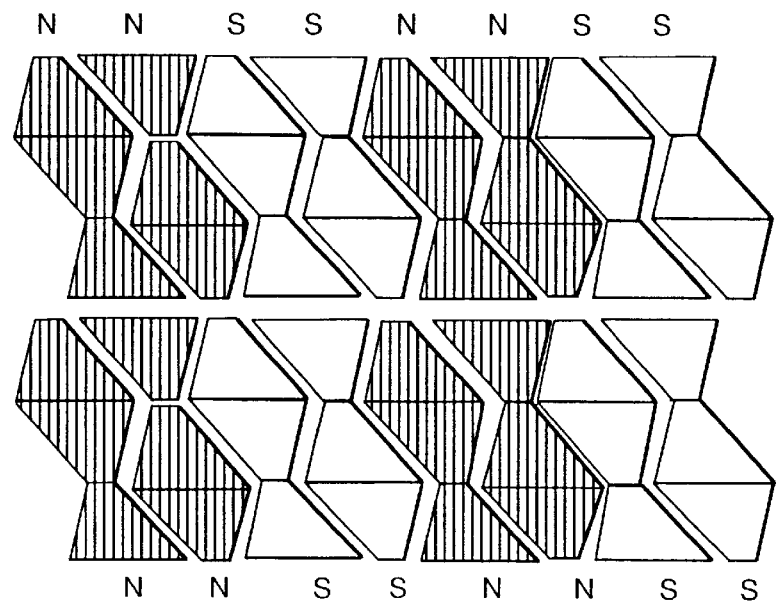

FIG. 9D shows an example the stator and the winding type rotor shown in FIG. 9C are provided in a duplex same electric machine, accordingly a complex electric machine in which plural electric motors and generators are placed side by side in a single electric machine and one is the generator and another is the electric motor can be realized in accordance with the combination of the electromagnets according to the present invention.

FIGS. 10A–10D show an example in which the skew effect for the starting compensation is held to the magnetic pole and except for above since the construction in FIGS. 10A–10D is similar to that of FIGS. 9A–9D, the detailed explanation for FIGS. 10A–10D will be omitted.

FIGS. 11A–11E shows the stator and the winding type rotor of the multi-phase electric machine which are formed using the bobbin winding electromagnets according to the present invention and a structure explanatory view of a case where the main coil of each phases and the coil of other phase are placed side by side.

Figure 11A:
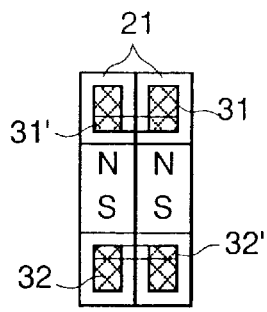
FIGS. 11A–11E are structure explanatory views showing a stator of four poles multi-phase electric machine and a winding type rotor in which a main coil of each phases and a coil of other phase are put side and side.

FIG. 11A shows an example of two phase type electric machine. In FIG. 11A, this electric machine comprises a magnetic pole 21 in which the magnetic poles are arranged to an inner peripheral face, main coils 31 and 32 of each phases, and electromagnetic connection coil 31' and 32' which are placed side by side in other phase magnetic pole and for ensuring the electromagnetic connection to the other phases.

Figure 11B:
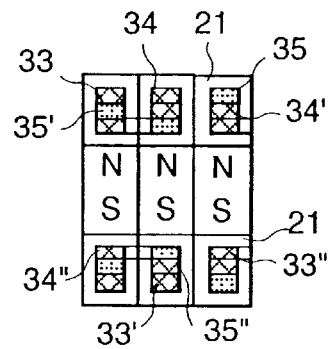

FIG. 11B shows an example of three phase type electric machine, this electric machine comprises a magnetic pole 21 in which the magnetic poles are arranged to an inner peripheral face, main coils 33, 34 and 35 of each phases, and electromagnetic connection coil 33', 33", 34', 34", 35' and 35" which are placed side by side in other phase magnetic pole and for ensuring the electromagnetic connection to the other phases.

With this electromagnetic connection coil structure, even the stator and the winding type rotor which is constituted by the iron core 21 having the electric magnetic pole having no projection portion, the smooth rotation magnetic field can be formed and the useful electric machine can be realized. It is possible to adopt this coil construction with the iron core having the electric magnetic pole having the projection portion.

Figure 11C:
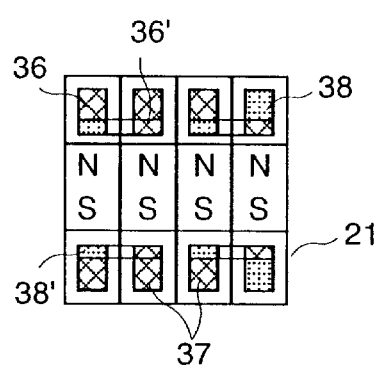
Figure 11D:
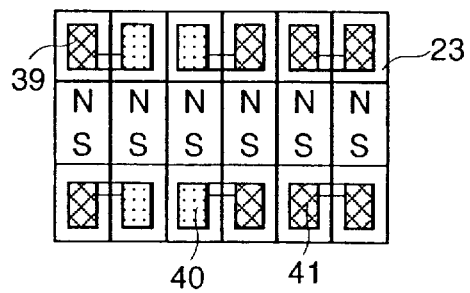

FIGS. 11C and 11D show other examples of the three phases type electric machine in which the construction of the iron core and the coil is varied. In FIG. 1C, one phase is constituted by two electromagnets, two iron cores 21 and two main coils 37, and other phase is constituted by one electromagnet, the iron core 21 and the main coils 36 and 38. On the other hand, the electromagnet connection coils 36, 36', 38' and 38" are provided with only two phases constituted by one electromagnet and placed side by side to other phase iron core 21 and then the electromagnetic connection is performed.

FIG. 11D shows the stator and the winding type rotor which is constituted of each phase pairs according to six iron cores 23 having the magnetic poles in the inner peripheral faces and comprising the magnetic pole having the projection portion. When the electromagnetic connection between the each phases according to the magnetic pole having the projection portion is weak, by providing the electromagnetic connection of the each phases then the connection can be strengthened.

Figure 11E:
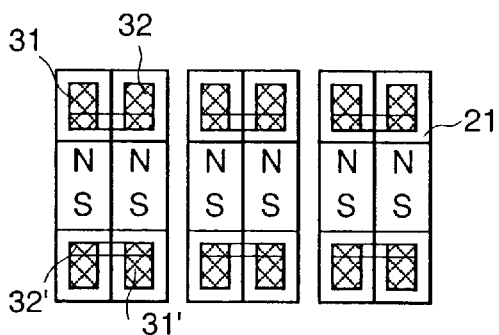

FIG. 11E shows an example in which plural electric machines are assembled and three stators shown in FIG. 1A are provided in a single electric machine. These plural stators can be combined only the generator, only the electric motor, or the combination of the generator and the electric motor and as occasion demands these plural stators can be used properly.

In the above, it explains about the general rotary electric machine to which the bobbin type electromagnet is adopted, however these techniques can be adopted other electric machines and the electromagnetic machines which use the electromagnet. Such electric machines are pancake type electric machine, a linear motor, and the electromagnet machines etc. are.

As stated in above, the present invention looks at again the iron core structure of the electric motor and the generator which use the magnet and the electromagnet and in particularly the present invention relates to the structure and the material structure and the electromagnet of the iron core having the projection portion which is adopted to the alternative current electromagnet. The power saving performance of the assembly working of the winding and the assembling working and the reliability can be improved remarkably, accordingly, the electric machine which is low in cost and the equipment cost is low can be realized.

Further, the electromagnet according to the present invention is adopted to the stator and the winding type rotor of the electric machine and in the single electric machine the complex electric machine such as the electric generator, plural generators, and the electric motor can be realized by overlapping plural electromagnets and by shifting off them to the circumferential direction. When the present invention is adopted to these electric machines, even the magnetic pole and the phase number becomes large it can be corresponded easily. For example, when the magnetic pole is increased in the same coil only increasing the magnetic pole it is possible to carry out hardly the cost-up in cost.

Further, when the phase number is increased, by shifting off the phase number electric angle of the same electromagnet to the circumferential direction it can be realized simply. Further, as to the starting compensation of the electric machine, in the prior art the skew is performed to the stator and the rotor, however the working performance is obstructed remarkably.

On the other hand, in the present invention it can be realized in accordance with only the shape of the magnetic pole face and the shift-off of the mutual electromagnets to the circumferential direction. Further, since the coil portion is made simply to the bobbin type, the heat resistance material such as the ceramic material can be adopted with the simple structure and the electric machine having the heat resistance temperature can be realized.

Figure 12A:
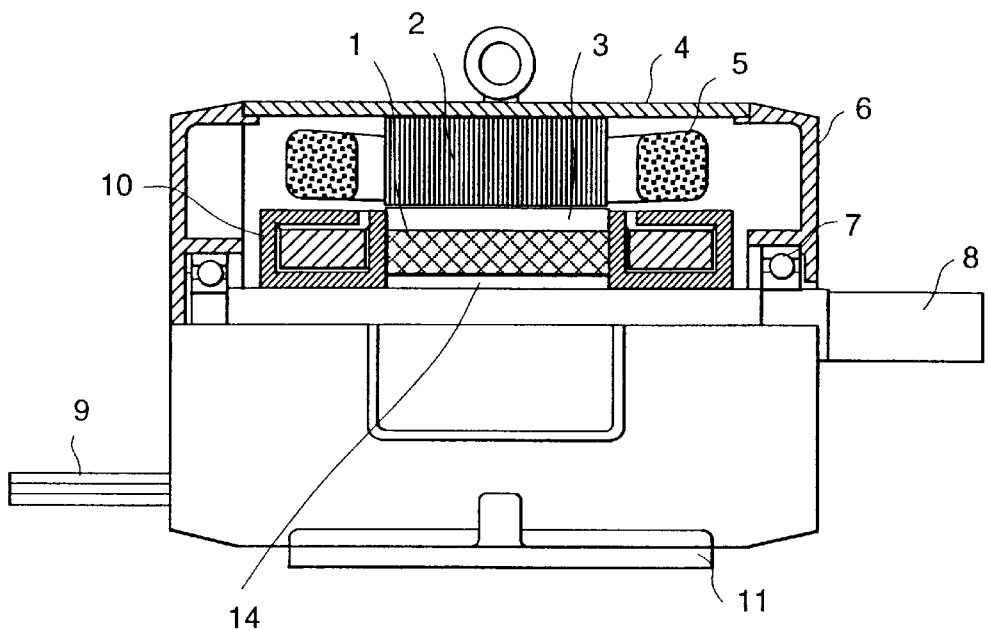
FIG. 12A is a structure view of an example of a structure of one embodiment of an inner rotary type generator having a rotor which is constituted by a magnet type skewed rotor according to the present invention.
Figure 12B:
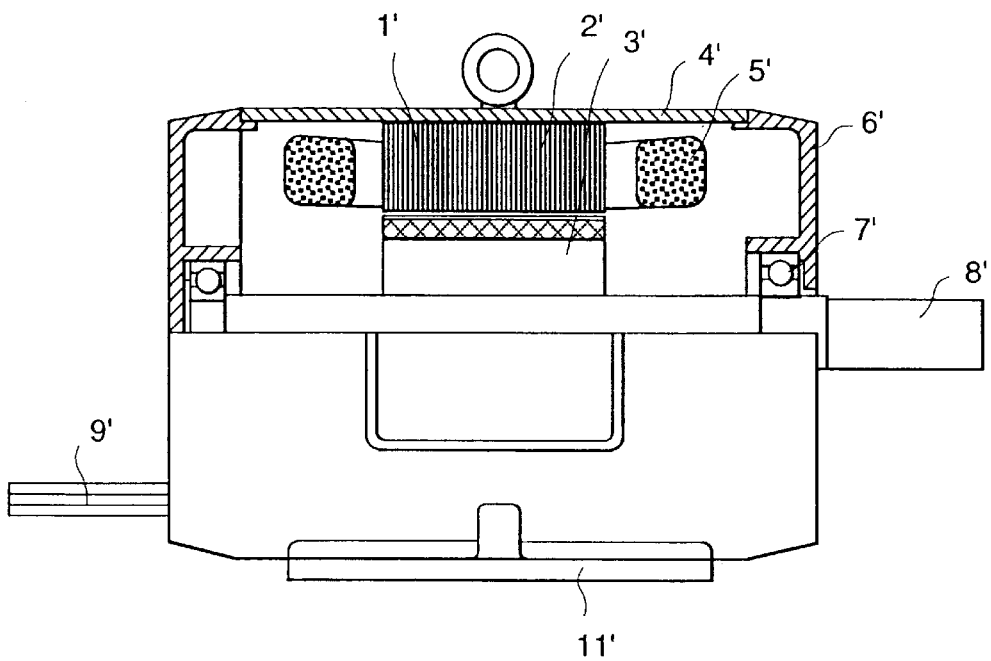
FIG. 12B is a structure view of an example of a structure of one embodiment of an inner rotary type generator having a rotor according to the prior art.

Herein-after, the present invention will be explained referring to the other embodiments for carrying out the present invention and by exemplifying an inner rotary type generator. FIG. 12A shows an inner rotary type generator according to the present invention. FIG. 12B shows an inner rotary type generator according to the prior art.

As shown in FIG. 12B, the conventional generator comprises a magnet 1', a stator 2', a cylindrical shape magnet rotor 3', a housing 4', a coil 5', an end bracket 6', bearing members 7', a shaft 8', an electric power supply cord 9', and a base 11'. FIG. 12B shows a cross-sectional structure of the generator in which the conventional cylindrical shape magnet rotor 3' is installed.

On the other hand, as shown in FIG. 12A, in the embodiment according to the present invention, a generator comprises a magnet 1, a stator 2, a magnet type magnet rotor 3, a housing 4, a coil 5, an end bracket 6, bearing members 7, a shaft 8, an electric power supply cord 9, a base 11, and a non-magnetic body 14.

FIG. 12A shows a cross-sectional structure of a generator in which the generator has a skew structure according to the present invention and the rotor 3 which is constituted by the single magnet 1 or a combination of the electromagnet 10.

In the present invention, when a rotor is driven by from an outside according to a power force source, to a coil 5 etc. which is winded on the stator 2 a voltage in response to a rotation number occurs, when a load such as a resistor is connected to the electric power take-out cord 9, then the current is flown and the electric power is supplied. A generation voltage of the coil 5 is proportional to a magnetic flux density of an air gap between the stator 2 and the rotor 3 and also is proportional to a rotation number.

In the present invention, to reduce a starting torque and a cogging of a magnet type rotor which is formed to the rotor 3 by magnets arranged in a radial direction, the skew structure is formed and further the productivity of the rotor 3 is taken into a consideration.

Figure 13A:
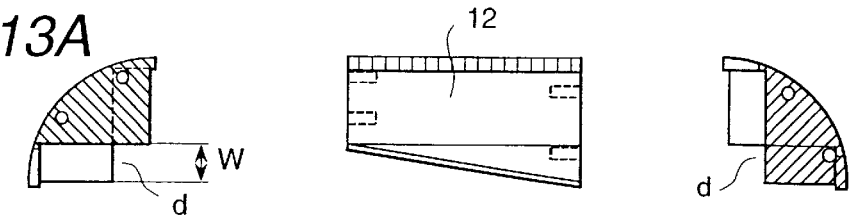
FIGS. 13A–13D are structure views of an example of a structure of a magnet type skewed rotor in which a four-pole division and separation magnet iron core is arranged to a regular square shape non-magnetic body.

Next, a structure, a material, a construction of an iron core and a non-magnetic body spacer of the magnet type skew rotor according to the present invention will be explained referring to the figures. FIGS. 13A–13D show an iron core structure of a magnet type rotor which is used in an inner rotary type four-pole electric machine and in which a skew structure is performed. FIG. 13A shows a plan view and a side view of both sides of a division iron core 12 used in the inner rotary type electric machine.

In this case, when a skew width W is formed, at the same time an inner diameter portion is formed, such an inner diameter portion is engaged to across over a ridge-line of a quadrilateral shape non-magnetic body 14. In this figure, a right angle cut-off portion d is formed. And further the inner diameter portion has a detent function.

Figure 13B:
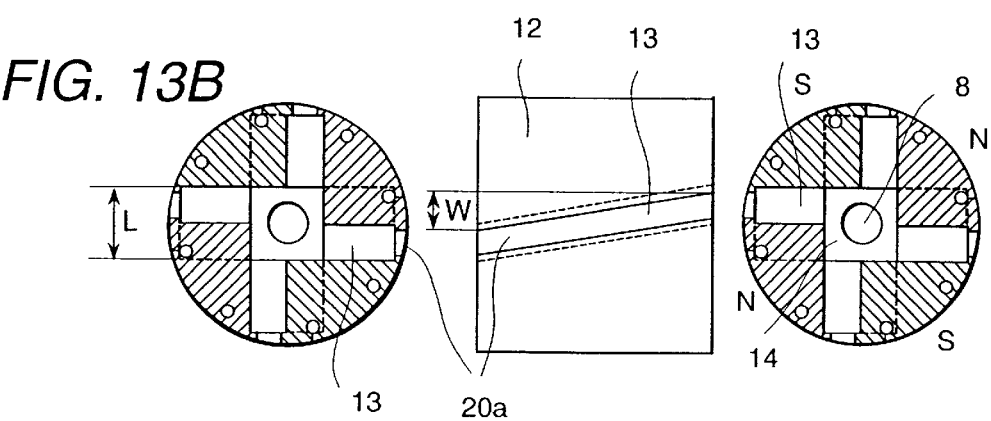

FIG. 13B shows a plan view and a side view of both sides of a magnet type rotor in which a skew structure is performed of a four-pole electric machine by combing four division iron cores 12 shown in FIG. 13A. In this case, as to the skew width W enable to form, there is a limitation naturally according to an iron core outer diameter, a magnet dimension (in particular a radial direction dimension), a length of a side multi-angular non-magnetic body, etc.

When a length of one side of the quadrilateral shape non-magnetic body 14 is expressed by L, the skew structure will be formed from 0 to $1/2 \times L$, in which $W=1/2 \times L$ is the maximum. Herein, when a large skew structure is intended to perform, as shown in FIG. 13C and FIG. 13D, the iron core 12 is divided into pieces in the axial direction, and in each iron cores the maximum skew width $W=1/2 \times L$ is performed, and integrating these skews, about four times skew width W in comparison with that of shown in FIG. 13B is realized.

Figure 13C:
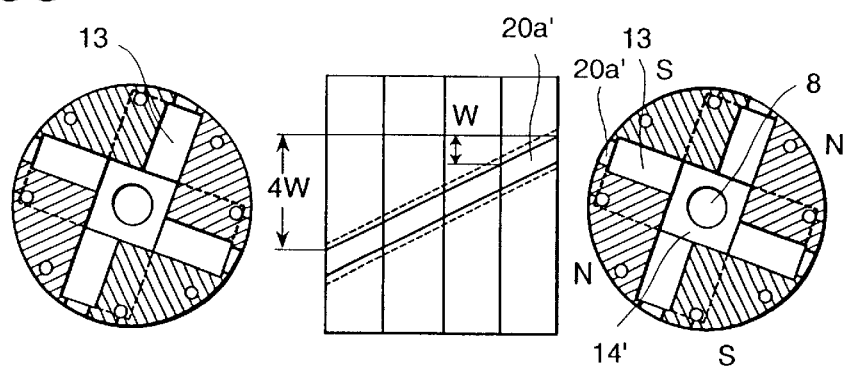

In a case of FIG. 13C, a non-magnetic body 14' fixed to a shaft 8 according to an insertion under pressure is divided into four pieces, and further when the non-magnetic body 14' is fixed to the shaft 8, it is an essential that the skew structure formation having a linear shape or a zigzag shape etc. is carried out to form suitably according to an aim, namely the skew structure is shifted off each other with a proper angle and in a case of the zigzag formation it is carried out without a shift-off of the angle.

Figure 13D:
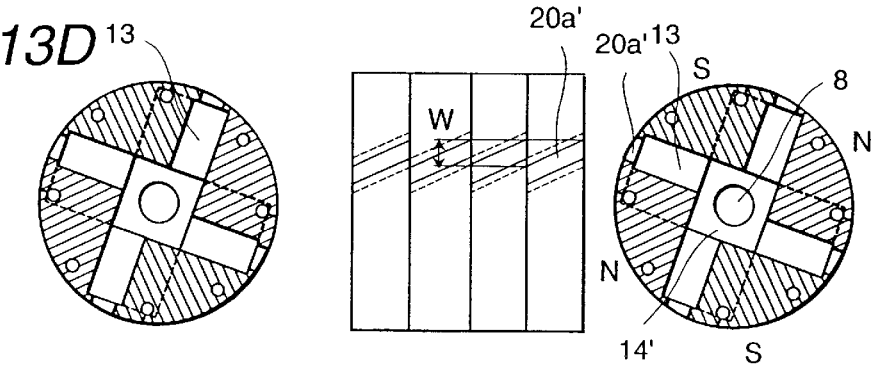

In a case of FIG. 13D, according to the demands, between the division iron cores a non-magnetic body spacer is inserted and then a leakage of a magnetic flux of the mutual magnetic poles can be prevented. Accordingly, the skew width and the skew shape can be formed freely by varying them according to demands.

Figure 14A:
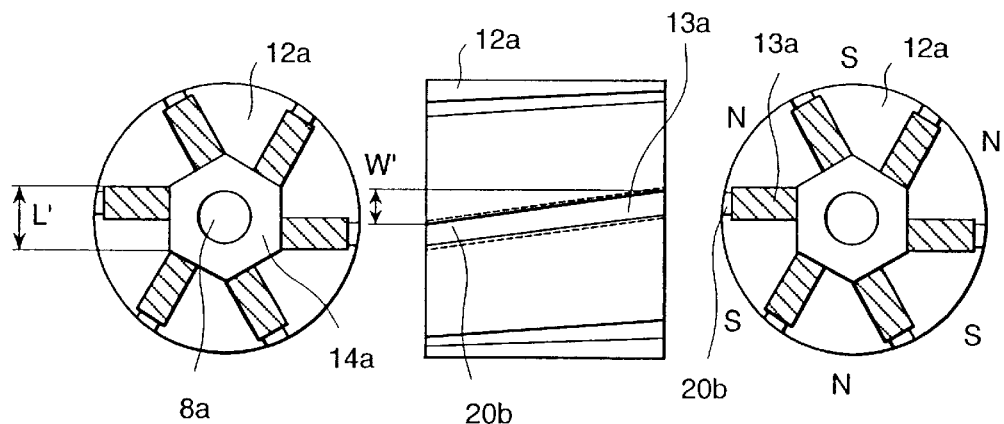
FIG. 14A and FIG. 14B are explanatory views showing of a magnet type skewed rotor in which a six-pole and an eight-pole division and separation magnet iron cores are arranged to a regular hexagon shape and a regular octagon shape non-magnetic body.
Figure 14B:
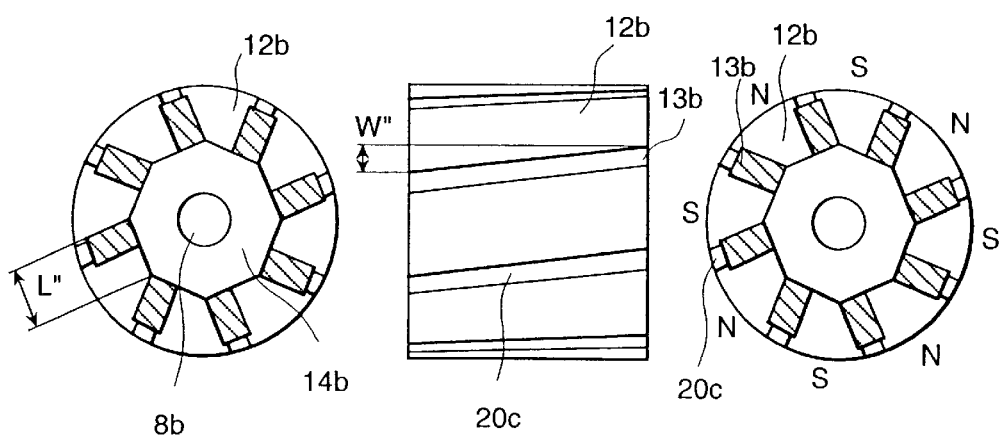

FIG. 14A and FIG. 14B show examples of a six-pole rotor and an eight-pole rotor against the four-pole rotor shown in FIGS. 13A–13D. FIG. 14A shows a construction example of a six-pole rotor and a skew width W' is formed with $W' \leq 1/2 \times L'$ and FIG. 14B shows a construction example of an eight-pole rotor and a skew width W" is formed with $W'' \leq 1/2 \times L''$.

Figure 15A:
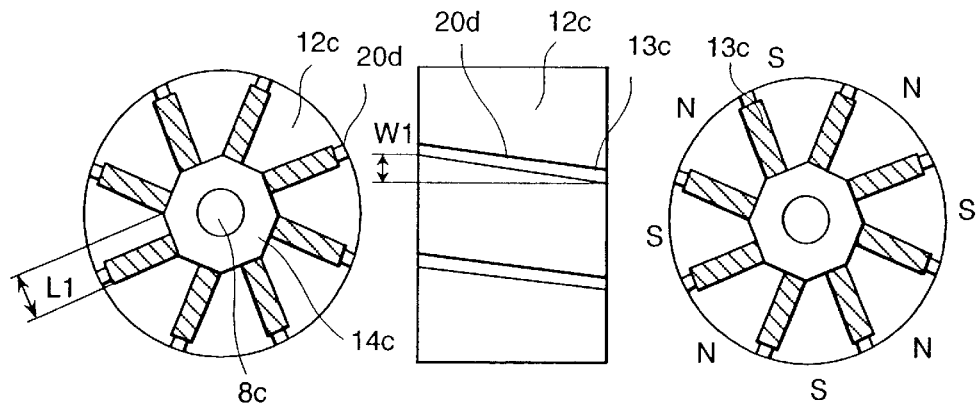
FIGS. 15A–15C are explanatory views of an example of a magnet type skewed rotor having a magnet iron core in which three kinds regular octagon shape non-magnetic body having different diameter is arranged.
Figure 15B:
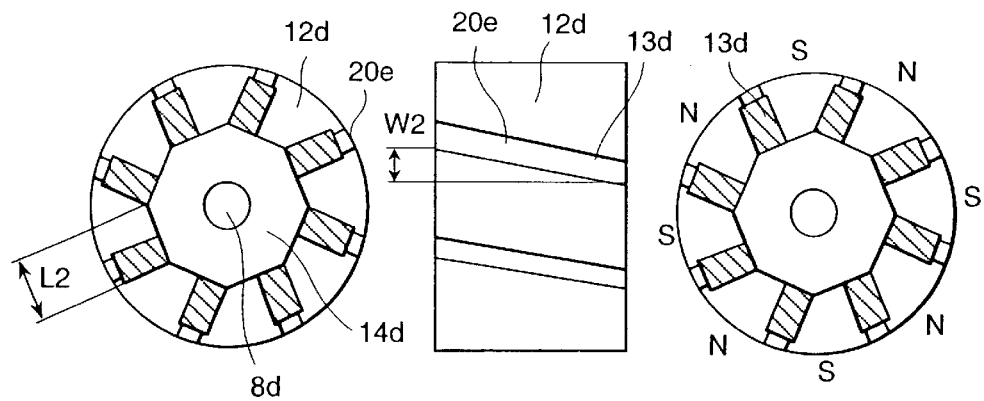
Figure 15C:
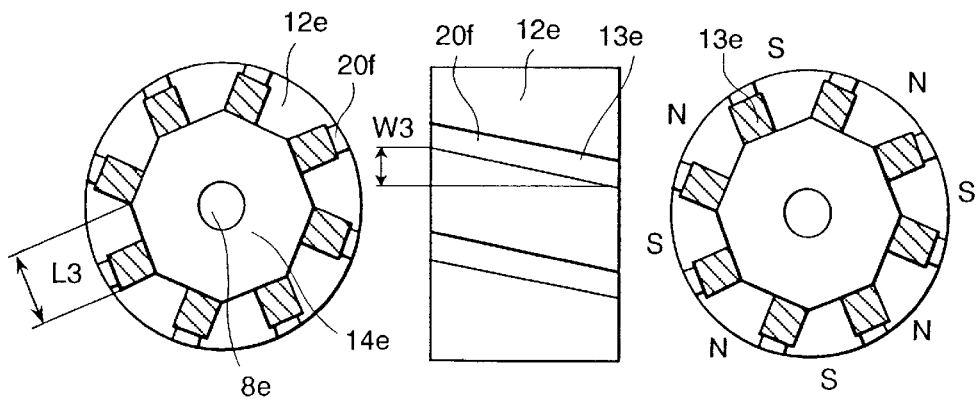

FIGS. 15A–15C show eight-pole rotors in which the skew width is varied according to the variation an outer diameter of non-magnetic bodies 14c, 14d, and 14e. The outer diameters of the non-magnetic bodies are $14e > 14d > 14e$ and the skew width is formed large in proportion to the outer diameter and it forms W1<W2<W3.

In this case, to maintain the strength of the magnetic pole, in the magnets 13d and 13e in comparison with the magnet 13c, a reduction of a length of a radial direction is compensated by an increase of the width of the magnet. In these multi-pole rotor, by diving in the axial direction of the iron core shown in FIG. 13C similarly to the skew width can be varied freely.

Each of FIGS. 16A–16D, FIGS. 17A–17D, and FIGS. 18A–18D shows a skewed magnet type rotor in which an iron core of a rotor is divided, and a magnet is inserted in parallel in the radial direction and the axial direction is shifted off some angle with an axial center in response to the skew and the skew structure is formed with a zigzag shape and further a cylindrical shape iron core having a skew shape groove at an outer periphery of an iron core portion is arranged.

In this case, the magnet insertion iron cores 23 and 23a can be manufactured by a single ferrite block material and by a laminated layer ferrite plate and accordingly the structure has a superior productivity at a low cost. The holes 22, 22a, and 22b which are opened on the iron core are positioned on the same periphery and plural holes are provided by suiting to the skew angle with the same pitch, accordingly between the divided iron cores a combination and an assembly of the division iron cores can be carried out smoothly.

Each of FIGS. 16A–16D shows a single cylindrical shape iron core and after the iron core in which the magnets 21a, 21b, and 21c are inserted respectively has carried out the skew structure with the zigzag shape using the holes 22, a cylindrical shape iron core 24 is arranged at an outer periphery. When the skew structure is made large, making large the widths of the magnets 21a, 21b, and 21c and the width of a skew shape groove 20g and shifting off largely the holes 22 between the iron cores then the skew structure can be formed large.

When the iron core portion is formed on the laminated layer iron core, since the punching is manufactured using the same manufacturing tool with that of the iron core of the stator, the low cost and the superior productivity can be attained.

Figure 16A:
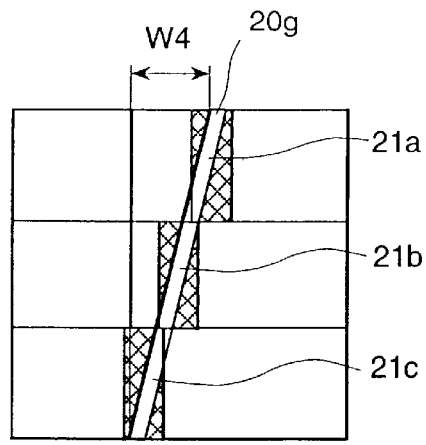
FIGS. 16A–16D are explanatory views showing an example of a magnet type skewed rotor in which a zigzag magnet iron core using a laminated layer iron core and a cylindrical iron core having a skewed groove are combined.
Figure 16B:
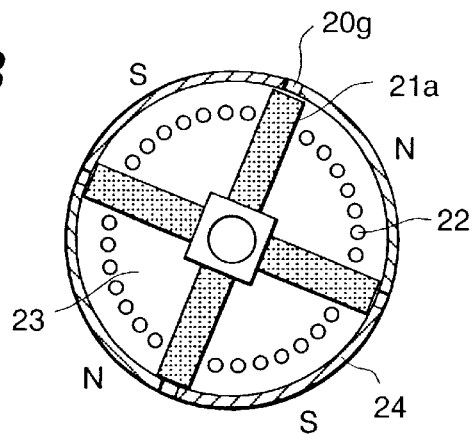
Figure 16C:
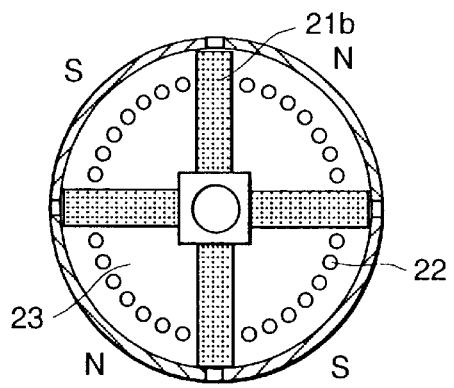
Figure 16D:
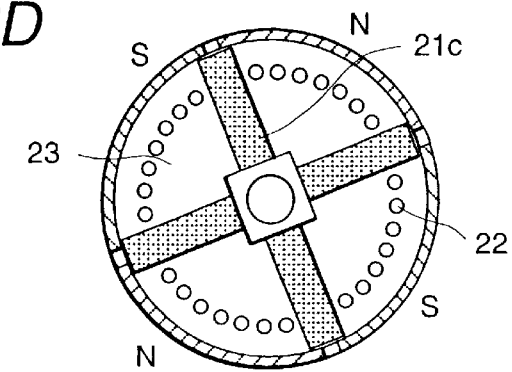

Each of FIGS. 17A–17D shows a magnet type-skewed rotor in which in place of the cylindrical shape iron core 24 arranged at the outer periphery of the magnet iron core shown in FIG. 16A it is replaced by plural cylindrical shape iron cores 24a, 24b, and 24c.

Figure 17A:
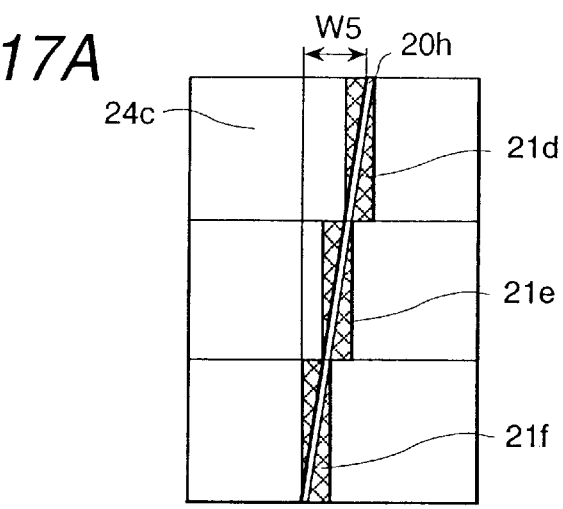
FIGS. 17A–17D are explanatory views showing an example of a magnet type skewed rotor in which a zigzag magnet iron core using a laminated layer iron core and a cylindrical iron core having plural skewed shape grooves are combined.
Figure 17B:
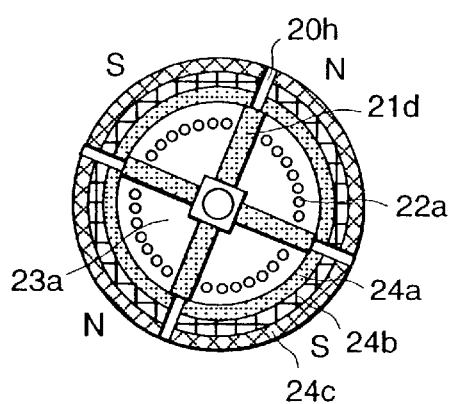
Figure 17C:
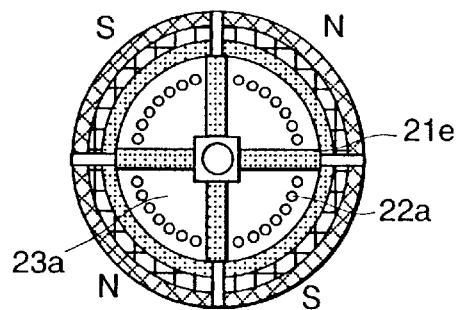
Figure 17D:
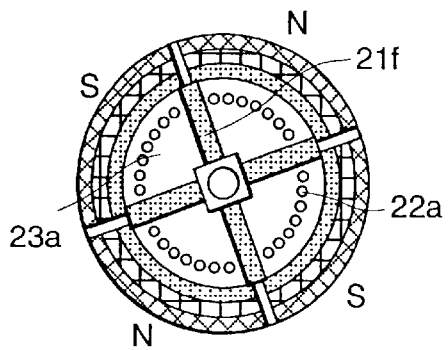
Figure 18A:
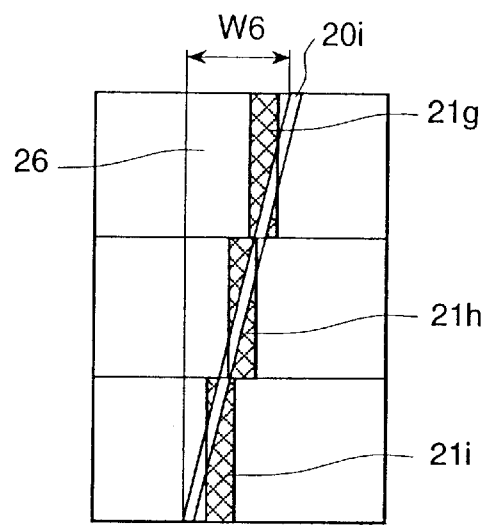
FIGS. 18A–18D are explanatory views showing an example of a magnet type skewed rotor in which a zigzag magnet iron core of an iron core etc. using a laminated plate and a laminated plate cylindrical iron core having a skewed shape groove are combined.
Figure 18B:
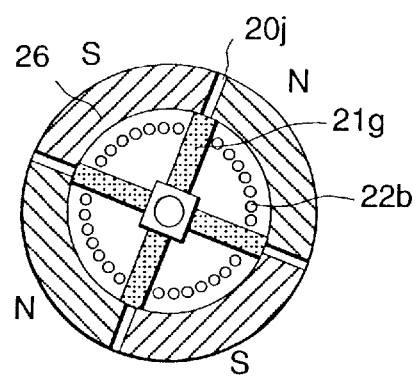
Figure 18C:
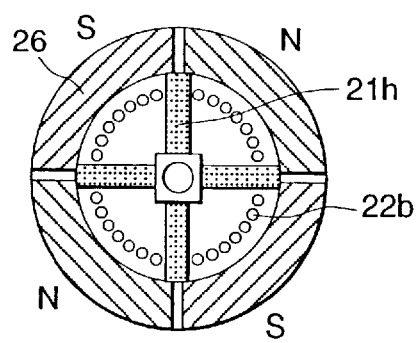
Figure 18D:
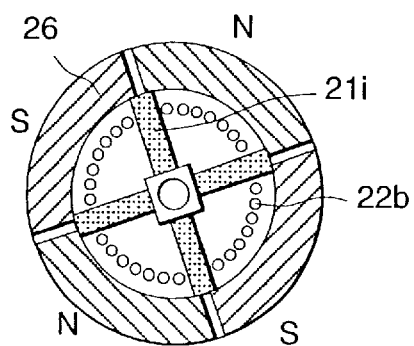
Figure 19A:
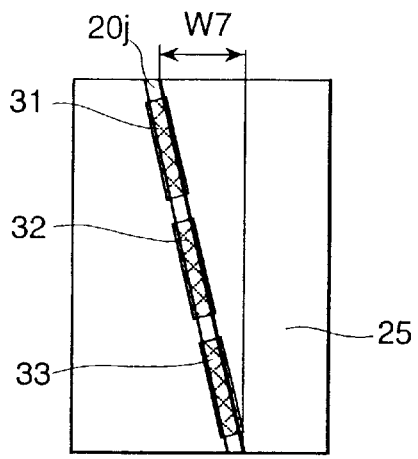
FIGS. 19A–19D are explanatory views showing an example of a magnet type skewed rotor in which to a skewed laminated plate iron core a magnet having plural divided characteristic are same or differ are arranged.
Figure 19B:
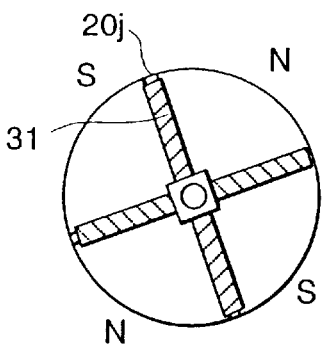
Figure 19C:
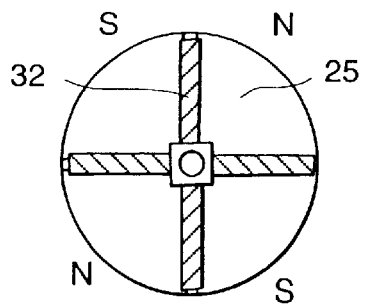
Figure 19D:
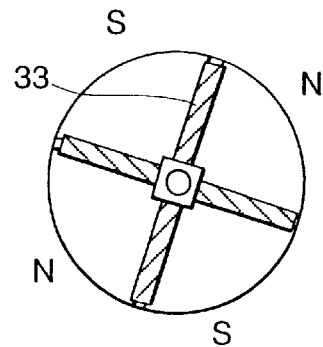
Figure 20A:
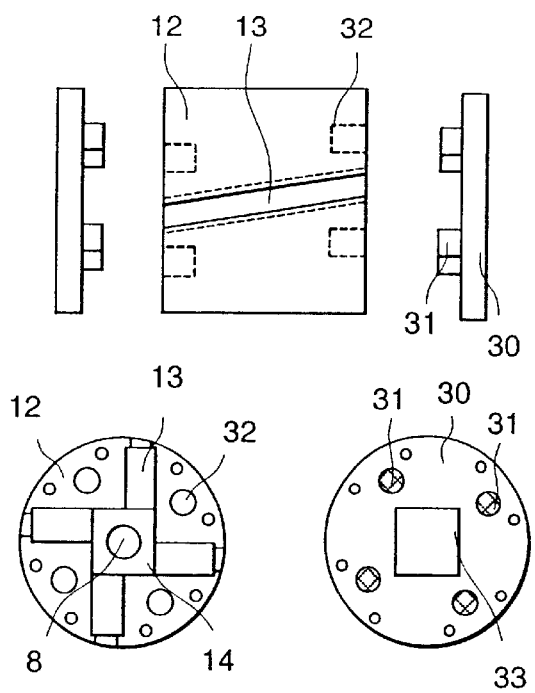
FIGS. 20A–20B are explanatory views showing an example of a rotor structure to which an anti-centrifugal force structure using a pin, a side plate, and an isolation plate is employed.
Figure 20B:
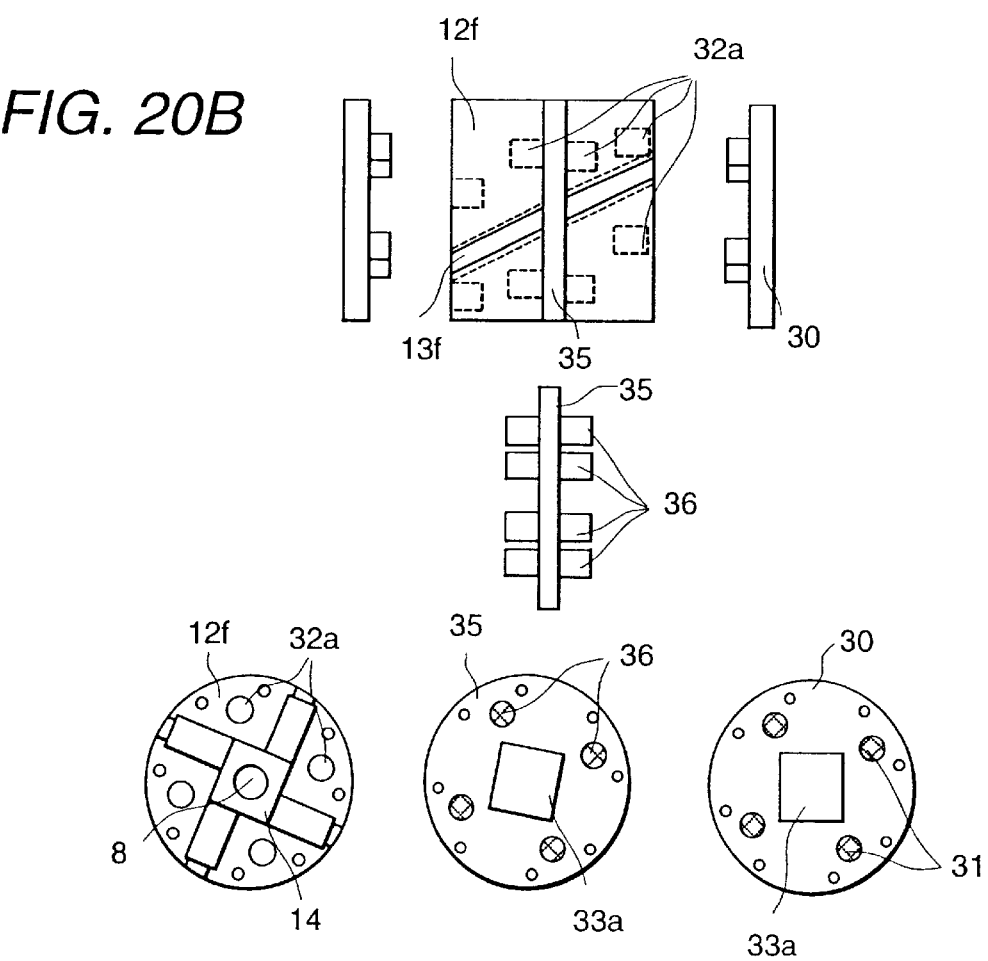
Figure 21A:
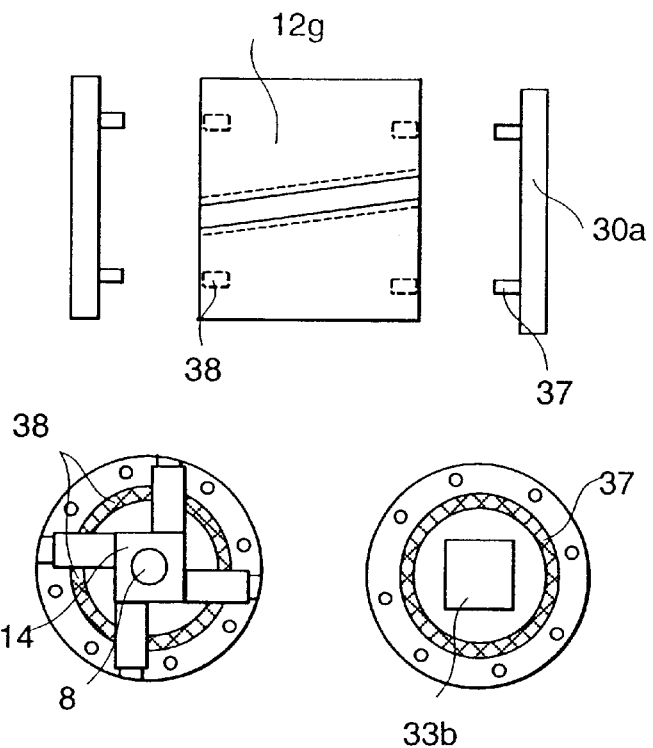
FIGS. 21A and 21B are explanatory views showing an example of a rotor structure to which an anti-centrifugal force structure using a ring, a side plate, and an isolation plate is employed.
Figure 21B:
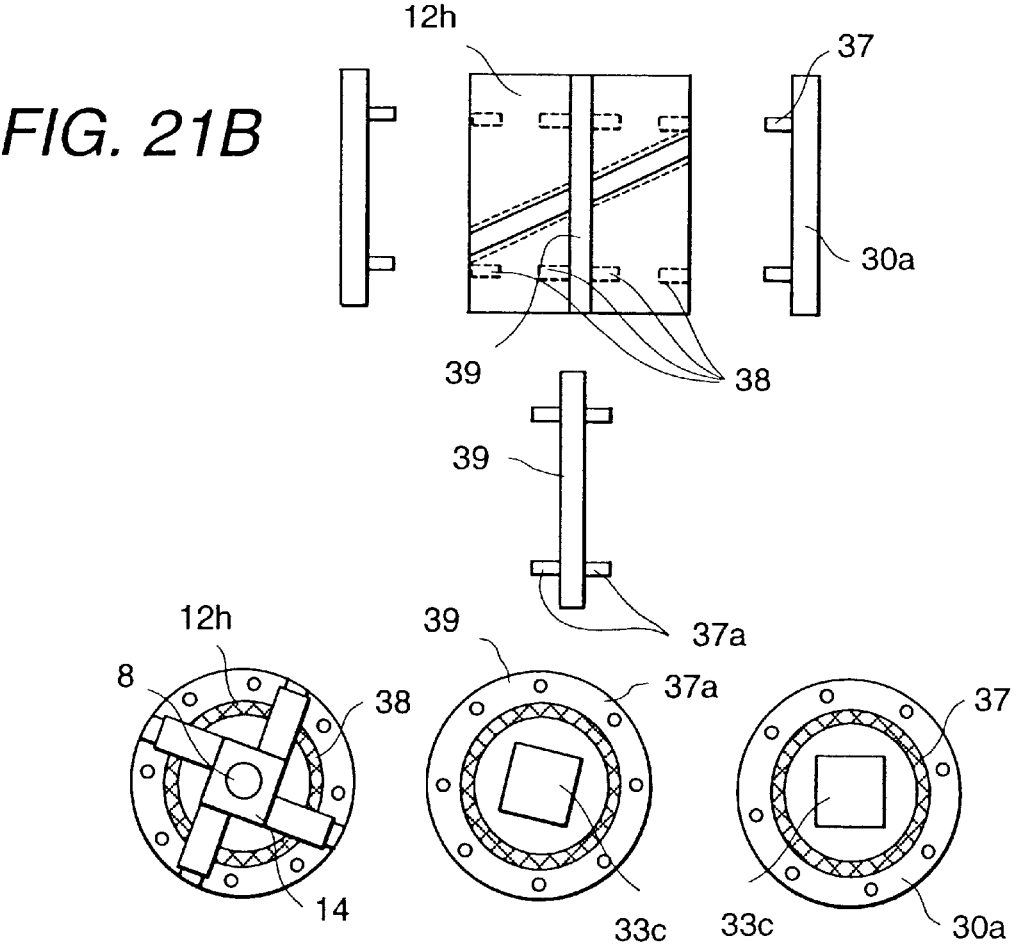

In FIG. 17A, when the cylindrical shape iron core 24 becomes thick, to rise the productivity the iron cores are divided in a thickness direction and an aim can be attained. An outside portion of the skew divided cylindrical shape iron core is formed larger, and accordingly a minute adjustment of the skew width and the improvement of the magnetic characteristic of an iron core air gap portion in an air gap between the stator and the rotor being opposed to the stator can be attained.

Each of FIGS. 18A–18D is an example in which the cylindrical iron core is formed with the laminated layer iron core and the cylindrical shape iron core in which the skew structure being carried out commonly is performed is arranged at the outer periphery of the zigzag skew structure magnet iron core. In this case, all of the iron core kinds can be formed by the laminated materials, and the magnet type skewed rotor suitable to the high production cost and the high productivity can be provided.

Each of FIGS. 19A–19D shows a magnet type skews rotor in which after a rotor iron core has manufactured by an integral laminated iron core 25 and has skewed, to make a gap between the iron core at the minimum, plural divided magnets (to adjust the characteristic, the magnet having the different characteristic can be employed), are inserted from the outer periphery and the rotor is formed.

In this case, to prevent a fly-out of the magnet from the iron core slot, the rotor is fixed by means of a faucet manner, an insertion under pressure manner, a welding manner or an another component ring. In this embodiment according to the present invention, the integral laminated iron core is formed, in comparisons with the above stated embodiments of the present invention, the magnet type skewed structure rotor having the high productivity and suitable for the high mass production can be provided.

Each of FIGS. 20A–20B and FIGS. 21A–21B shows a structure in which to endure the centrifugal force during the high rotation time of the division iron core the structure is constituted shape side plates 30 and 30*a*, isolation plates 35 and 39, pins 31 and 36, rings 34 and 38, pin holes 32 and 32*a* provided on the iron core, and a ring groove 38. The side plates 30 and 30*a* and the isolation plates 35 and 39 are made of a non-magnetic body such as a stainless steel having the high strength to prevent the leakage of the magnetic field according to the demands. The side plates 30 and 30*a* and the isolation plates 35 and 39 are engaged with a spacer 14 by means of detent holes 33, 33*a*, 33*b*, and 33*c*.

In above, as to the inner rotary type rotary electric machine it has explained, however to an outer rotary type rotation electric machine since it employs a reversal structure, it will be adopted similarly to the inner rotary type rotary electric machine. Further, as the generator it has explained, however these techniques can be adopt an electric machine and an electromagnet machine and apparatus to which another magnet is used. For example it can adopt to a pancake type electric machine, a linear motor, and an electromagnet machine and apparatus, etc.

As stated in above, according to the present invention, the iron core structure, the iron core material and the iron core construction of the electric motor or the generator having a magnet skewed rotor are looked again, and the skew width can be varied freely, accordingly the starting torque and the cogging of the electric machine can be reduced and the electric machine having the low cost and the small equipment cost can be realized.

In particularly, with the skew structure formation according to the division and separation structure of the block rotor iron core and at the same time the ridge-line across-over structure of the detent multi-angular non-magnetic body, the present invention involves the remarkable techniques about the skew angle varying method by varying the length of one side of the multi-angular non-magnetic body, the skew width free variation by dividing into plural magnet iron cores.

Further, to raise the productivity during the mass production time, the iron core structure in which to the iron core the laminated layer iron core structure is used has a superior cost performance and has the great validity. Further, the rotor structure can be provided, such a rotor structure can be endured the centrifugal force during the high rotation time by accompanying with the division in the axial direction to make large the division iron core and the skew structure and has no leakage magnetic field and has the strong strength in the centrifugal force according to the pins, the rings, the side plates and the isolation plates.

What is claimed is:

1. A multi-phase rotary electric machine of an alternating current electromagnet in which a stator or rotor is formed by combining a bobbin winding and a magnetic pole iron core, wherein a magnetic pole shape facing an air gap portion formed between said stator and said rotor has a projection portion which is overlapped with another phase, and an electromagnetic agreement with each phase is disposed in a spaced arrangement of a magnetic pole in said air gap and said magnetic pole of each phase is strengthened with a contact and a laminated layer formed by divided cores, whereby a rotation magnetic field is formed smoothly and a performance and a vibration are improved.

2. A multi-phase rotary electric machine as claimed in claim 1, wherein the magnetic pole shape is a parallel quadrilateral shape such that a skew effect is obtained by a single magnetic iron core or plural iron cores.

3. A multi-phase rotary electric machine as claimed in claim 1, wherein the magnetic pole is formed by a ferrite sintering material to reduce an eddy current flow loss due to the rotation magnetic field.

4. In a rotary electric machine in which a multi-phase stator or a multi-phase rotor is formed by plural alternating current electromagnets which are formed by a bobbin winding and a magnetic pole iron core, wherein, in a bobbin winding for a respective phase, a bobbin winding of said respective phase is electromagnetically connected to a bobbin winding of another phase, and the bobbin winding of said respective phase and the bobbin winding of said another phase are both located in the same bobbin;

when the multi-phase stator is a two-phase stator, one adjacent coil is inserted into a main coil in the bobbin winding; and when the multi-phase stator is at least a three-phase stator, two adjacent coils are inserted into a main coil in the bobbin winding;

whereby an electromagnetic combination to the another phase is strengthened and a rotation magnetic field is formed efficiently, and a performance and a vibration are improved.

5. A rotary electric machine in which a stator or rotor is formed by combining a bobbin winding and a magnetic pole iron core, wherein a magnetic pole shape facing an air gap portion formed between said stator and said rotor has a projection portion which is overlapped with another phase, and an electromagnetic agreement with each phase is disposed in a spaced arrangement of a magnetic pole in said air gap and said magnetic pole of each phase is strengthened with a contact and a laminated layer formed by divided cores, and wherein in a bobbin winding for a respective phase, a bobbin winding of said respective phase is electromagnetically connected to a bobbin winding of another phase, and both the bobbin winding of said respective phase and the bobbin winding of said another phase are located in the same bobbin, whereby performance, efficiency and vibration are improved.

6. A rotary electric machine as claimed in claim 5, wherein the magnetic pole shape is a parallel quadrilateral shape such that a skew effect is obtained by a single magnetic iron core or plural iron cores.

7. A rotary electric machine as claimed in claim 5, wherein the magnetic pole is formed by a ferrite sintering material to reduce an eddy current flow loss due to a rotation magnetic field.

* * * * *